(12) United States Patent
Casagrande

(10) Patent No.: US 9,821,721 B2
(45) Date of Patent: Nov. 21, 2017

(54) VACUUM MOUNTED CARRIER FOR A VEHICLE

(71) Applicant: Charles L. Casagrande, Bradenton, FL (US)

(72) Inventor: Charles L. Casagrande, Bradenton, FL (US)

(*) Notice: Subject to any disclaimer, the term of this patent is extended or adjusted under 35 U.S.C. 154(b) by 0 days.

(21) Appl. No.: 14/024,410

(22) Filed: Sep. 11, 2013

(65) Prior Publication Data

US 2014/0076949 A1 Mar. 20, 2014

Related U.S. Application Data

(63) Continuation-in-part of application No. 13/497,653, filed as application No. PCT/US2010/049864 on Sep. 22, 2010, and a continuation-in-part of application No. 11/713,569, filed on Mar. 2, 2007, now abandoned.

(60) Provisional application No. 61/699,634, filed on Sep. 11, 2012, provisional application No. 61/244,769, filed on Sep. 22, 2009, provisional application No. 60/779,195, filed on Mar. 3, 2006, provisional application No. 60/899,202, filed on Feb. 2, 2007.

(51) Int. Cl.
  *B60R 9/08* (2006.01)
(52) U.S. Cl.
  CPC ...................... *B60R 9/08* (2013.01)
(58) Field of Classification Search
  CPC .............................................. B60R 2011/0056
  USPC ....... 224/559, 319, 327, 330, 321, 325, 553, 224/572; 248/206.2
  See application file for complete search history.

(56) References Cited

U.S. PATENT DOCUMENTS

| | | | | |
|---|---|---|---|---|
| 3,744,601 A * | 7/1973 | Doppelt | ........................ | 190/114 |
| 4,828,303 A * | 5/1989 | Soria | ........................ | B60R 13/04 |
| | | | | 248/206.3 |
| 4,836,482 A * | 6/1989 | Sokol | ........................ | B60R 11/02 |
| | | | | 248/206.3 |
| 4,842,148 A * | 6/1989 | Bowman | ........................ | 211/18 |
| 5,184,858 A * | 2/1993 | Arai | ........................ | 294/185 |
| 6,036,071 A * | 3/2000 | Hartmann | ........................ | B60R 11/00 |
| | | | | 224/482 |
| 6,283,310 B1 * | 9/2001 | Dean et al. | ........................ | 211/20 |
| 6,779,765 B2 * | 8/2004 | Zheng | ........................ | B60R 11/02 |
| | | | | 248/206.3 |
| 7,478,856 B1 * | 1/2009 | Ellis | ........................ | B60J 5/0498 |
| | | | | 296/37.1 |

(Continued)

FOREIGN PATENT DOCUMENTS

KR 1020100115278 A 10/2010

OTHER PUBLICATIONS

International Search Report for corresponding application PCT/US2013/059299 dated Dec. 23, 2013.

*Primary Examiner* — Justin Larson
*Assistant Examiner* — Phillip Schmidt
(74) *Attorney, Agent, or Firm* — Polster Lieder Woodruff & Lucchesi, L.C.

(57) ABSTRACT

A carrier system for a vehicle having a pair of vacuum devices shaped and sized to mate and secure to a recreational article. Each vacuum device includes a pad shaped and sized to detachably seat with a vehicle to form a vacuum cavity. The vacuum device includes a plunger attached to the pad and in fluid communication with the vacuum cavity, and an indicator positioned on the plunger to indicate the level of vacuum pressure within the vacuum cavity.

6 Claims, 26 Drawing Sheets

(56) References Cited

U.S. PATENT DOCUMENTS

| | | |
|---|---|---|
| 2001/0042766 A1* | 11/2001 | Ming-Shun .................. 224/324 |
| 2005/0265711 A1* | 12/2005 | Heibel ................... B60R 11/04 |
| | | 396/419 |
| 2007/0034657 A1 | 2/2007 | Murray |
| 2007/0216154 A1 | 9/2007 | Casagrande |
| 2010/0264285 A1 | 10/2010 | Buelna |
| 2012/0168481 A1 | 7/2012 | Casagrande |
| 2014/0263514 A1* | 9/2014 | Kniepmann ............ B60R 11/00 |
| | | 224/559 |

* cited by examiner

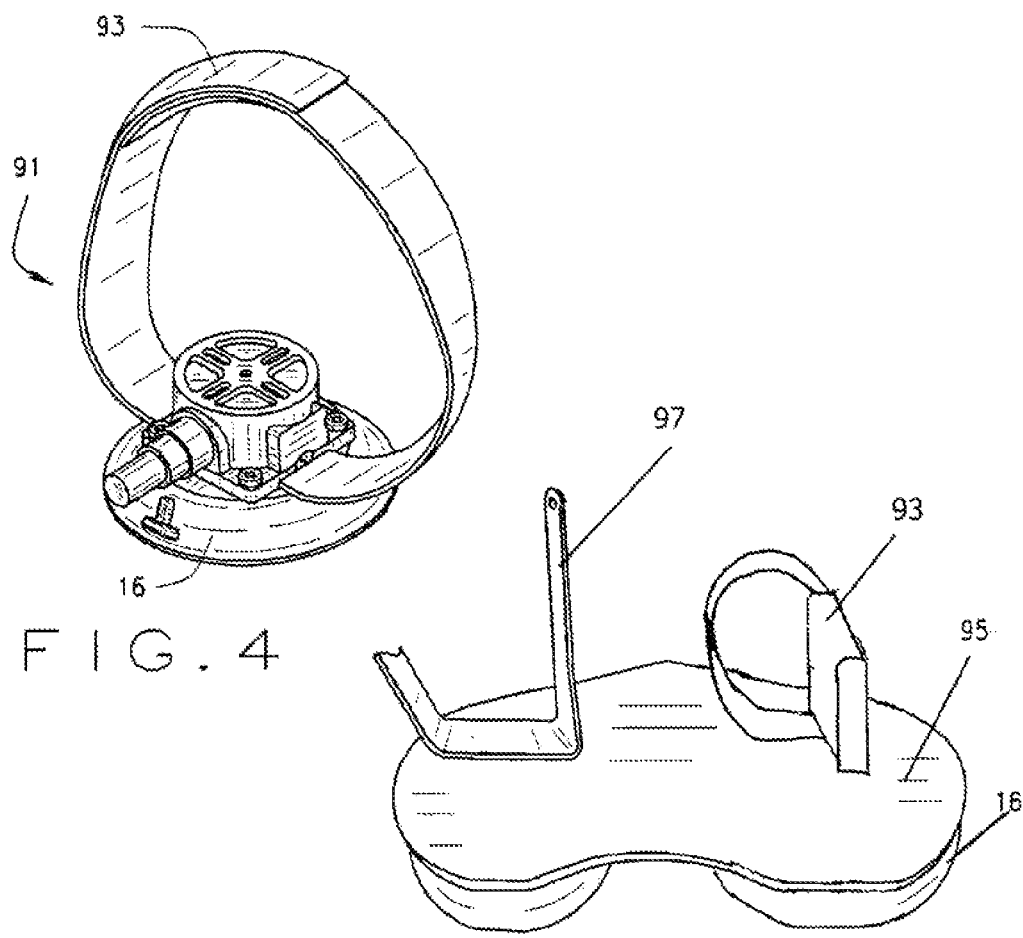
FIG. 4
FIG. 5
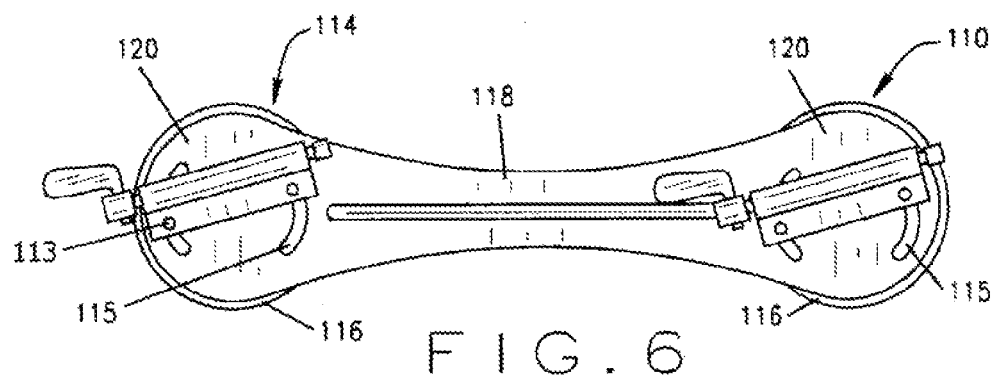
FIG. 6

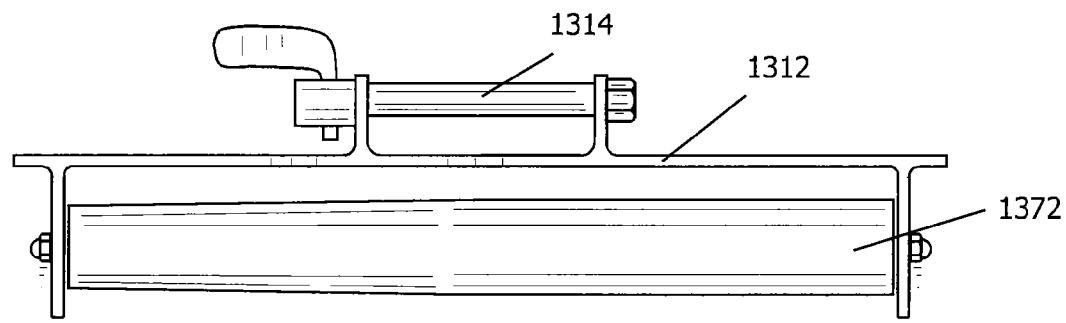
FIG. 22
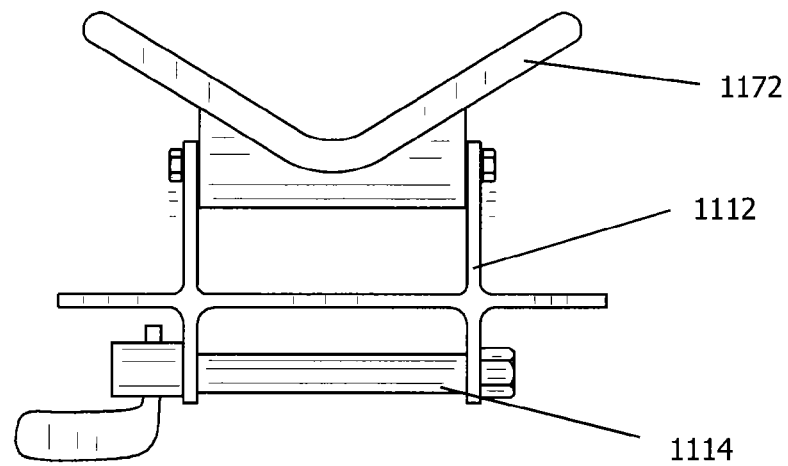
Fig. 16
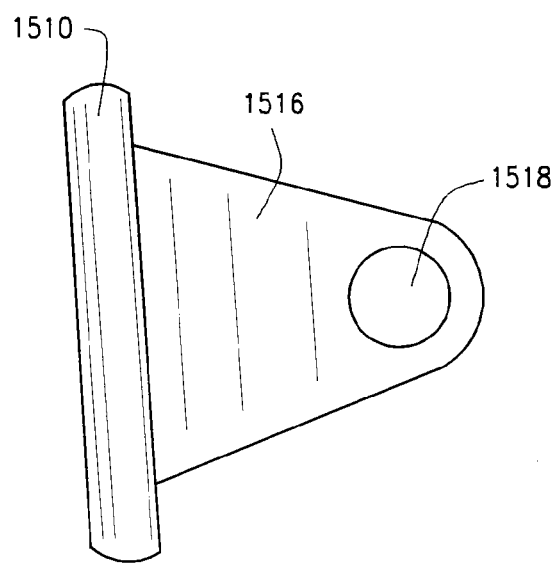 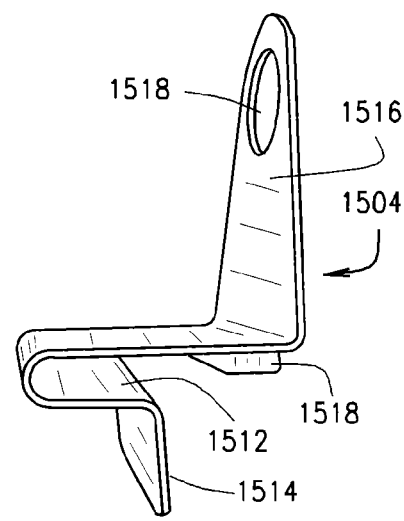
FIG. 18   FIG. 19

VACUUM MOUNTED CARRIER FOR A VEHICLE

CROSS-REFERENCE TO RELATED APPLICATIONS

This non-provisional application claims priority to U.S. Provisional Application Ser. No. 61/699,634 filed Sep. 11, 2012; and claims priority to U.S. application Ser. No. 13/497,653, filed Mar. 22, 2012, and derives priority from that application as well as from International Application PCT/US2010/049864, filed Sep. 22, 2010, and published under International Publication Number WO 2011/038029 A2 that derives priority to U.S. provisional application No. 61/244,769; and also priority to non-provisional U.S. patent application Ser. No. 11/713,569, filed Mar. 2, 2007, that derives priority from Provisional U.S. Patent Application Ser. No. 60/779,195 filed Mar. 3, 2006 and Provisional U.S. Patent Application Ser. No. 60/899,202 filed Feb. 2, 2007, which are hereby incorporated by reference.

STATEMENT REGARDING FEDERALLY SPONSORED RESEARCH

Not Applicable.

BACKGROUND

The present disclosure relates to a system that detachably installs to automotive vehicles for transporting articles without compromising, but instead maintaining the integrity of a mounting surface, and more particularly, to a carrier system that detachably installs to vehicles with a vacuum assembly for transporting articles.

Carriers or racks are commonly used with automotive vehicles to transport various recreational equipment, such as, bicycles, skis, snowboards, surfboards, and the like. Conventional carriers are mounted in one of these locations: to the roof, to the trunk, the rear window, to the truck bed, or to a trailer hitch. To withstand the large forces on the carrier and the supported articles while the vehicle is moving, conventional carriers must securely attach to the vehicle. Either the carrier is permanently attached to the vehicle with fasteners, or removeably attached to the vehicle using brackets, straps, or latches. However, both methods have disadvantages.

Permanently installed carriers can be expensive to purchase and install, and typically require modifications to the vehicle. In addition, they cannot be removed. Detachable carriers are difficult and time-consuming to install and must be repeatedly installed and removed. Also, they are susceptible to damaging the vehicle during installation and use due to the plates and straps applied to the vehicle under tension which causes denting and scratching. If improperly installed, damage can occur to the vehicle and the articles being transported.

Conventional racks are typically designed for use with a specific make and model of vehicle. Therefore, they generally do not work on different vehicles, at least not without adaptors or modifications. As a result, manufacturers must produce an increased number of parts and retailers must provide an ever increasingly complex list of parts options lists to consumers, which also increases the cost. In addition, consumers that purchase a rack for one vehicle cannot use the same rack for a different vehicle.

Therefore, a carrier that is easily and reliably installed and removed from a multiple vehicles is needed that maintains the integrity of a mounting surface.

DESCRIPTION OF THE DRAWINGS

In the accompanying drawings which form part of the specification:

FIG. 4 is a perspective view of a rear wheel mount;

FIG. 5 is a perspective view of an alternate embodiment of the wheel mount;

FIG. 6 is a plan view of a first alternate embodiment of the carrier system;

FIG. 16 is a perspective view of an eleventh embodiment of the carrier system;

FIG. 18 is a front view of locking clip;

FIG. 19 is a side view of the locking clip;

FIG. 22 is a perspective view of a fourteenth embodiment of the carrier system;

Corresponding reference numerals indicate corresponding parts throughout the several figures of the drawings.

DETAILED DESCRIPTION

Figure 1:
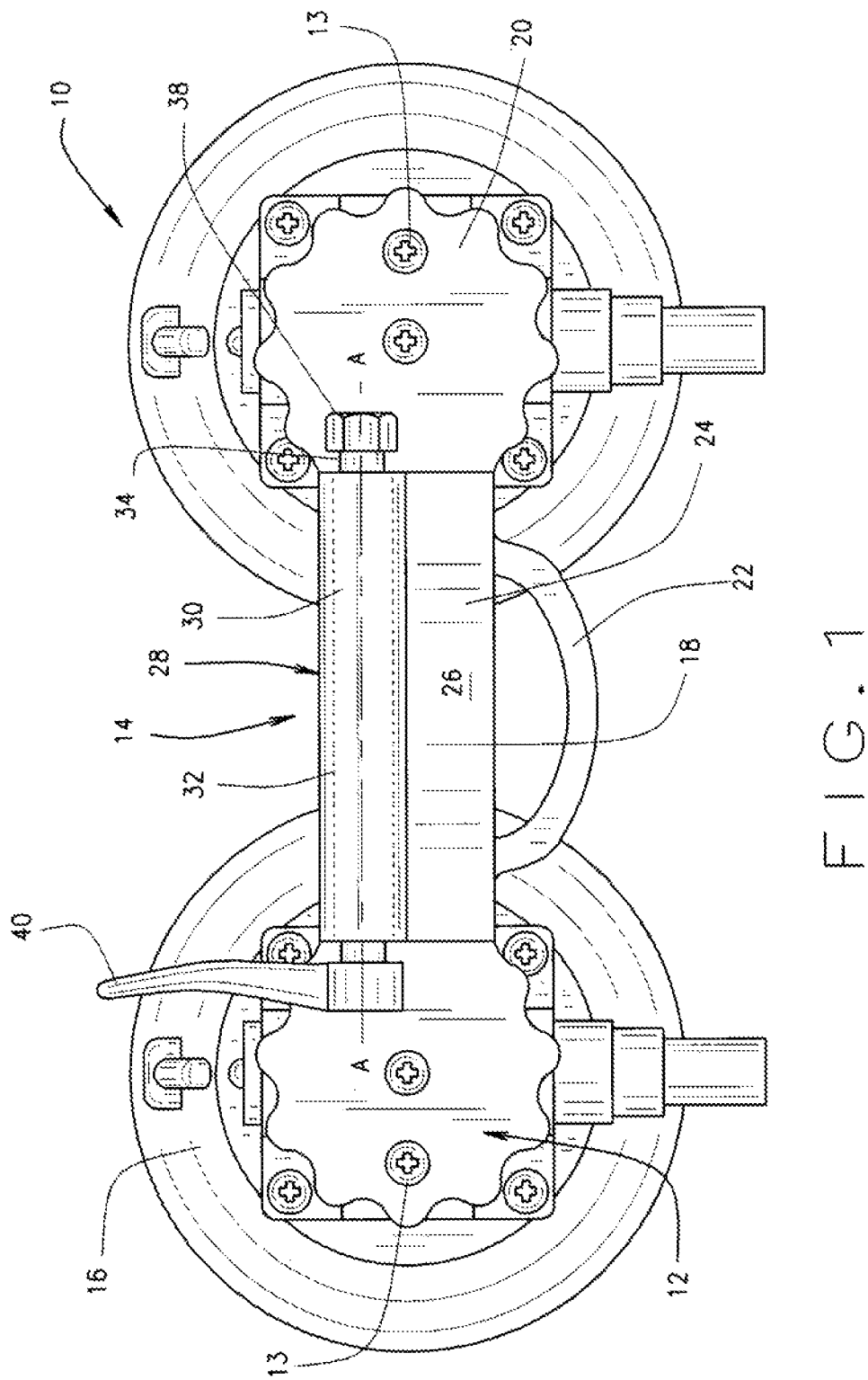
FIG. 1 is a perspective view of a carrier system.

The following detailed description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 2:
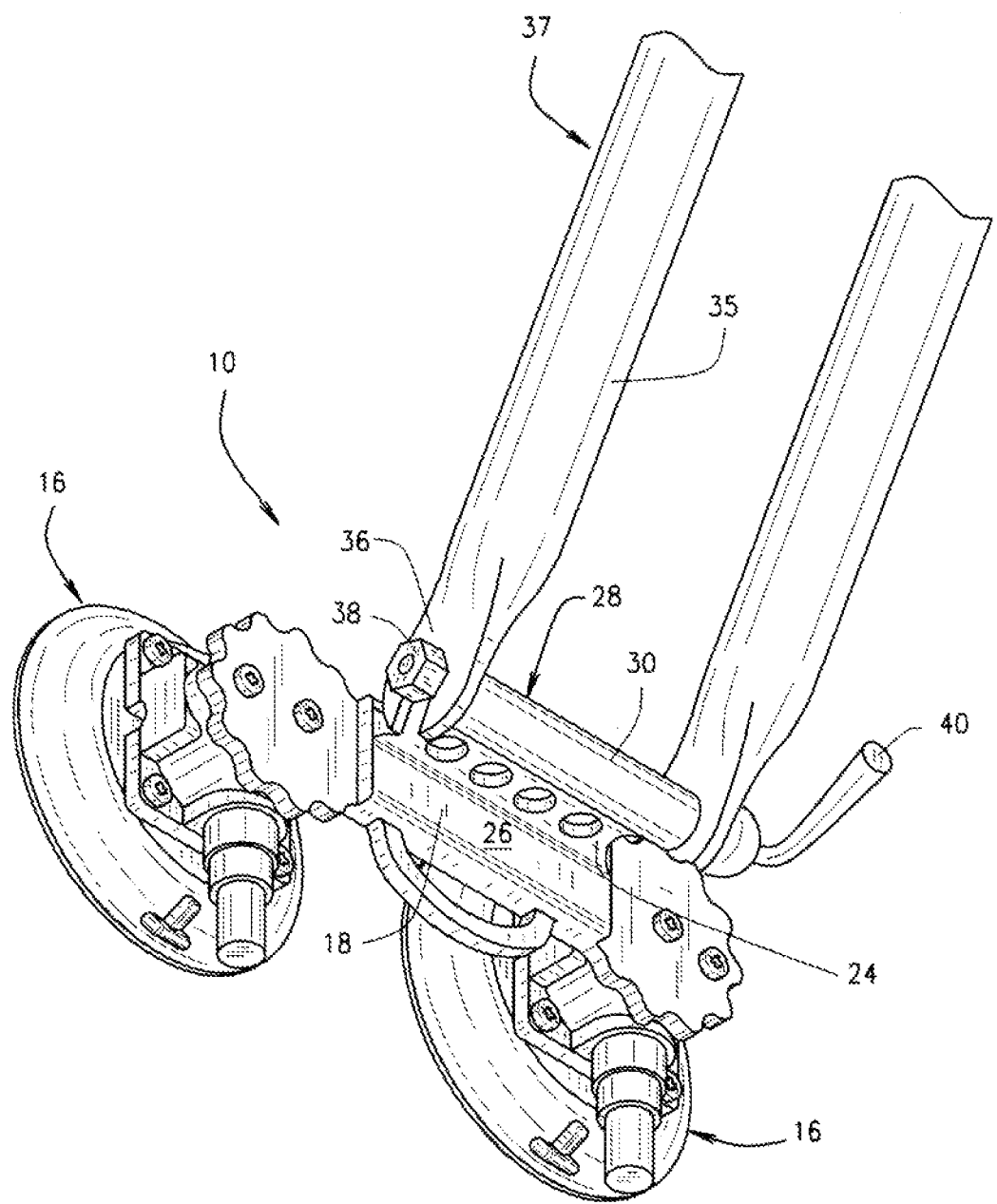
FIG. 2 is a perspective view of the carrier system of FIG. 1 securing a bicycle.
Figure 3:
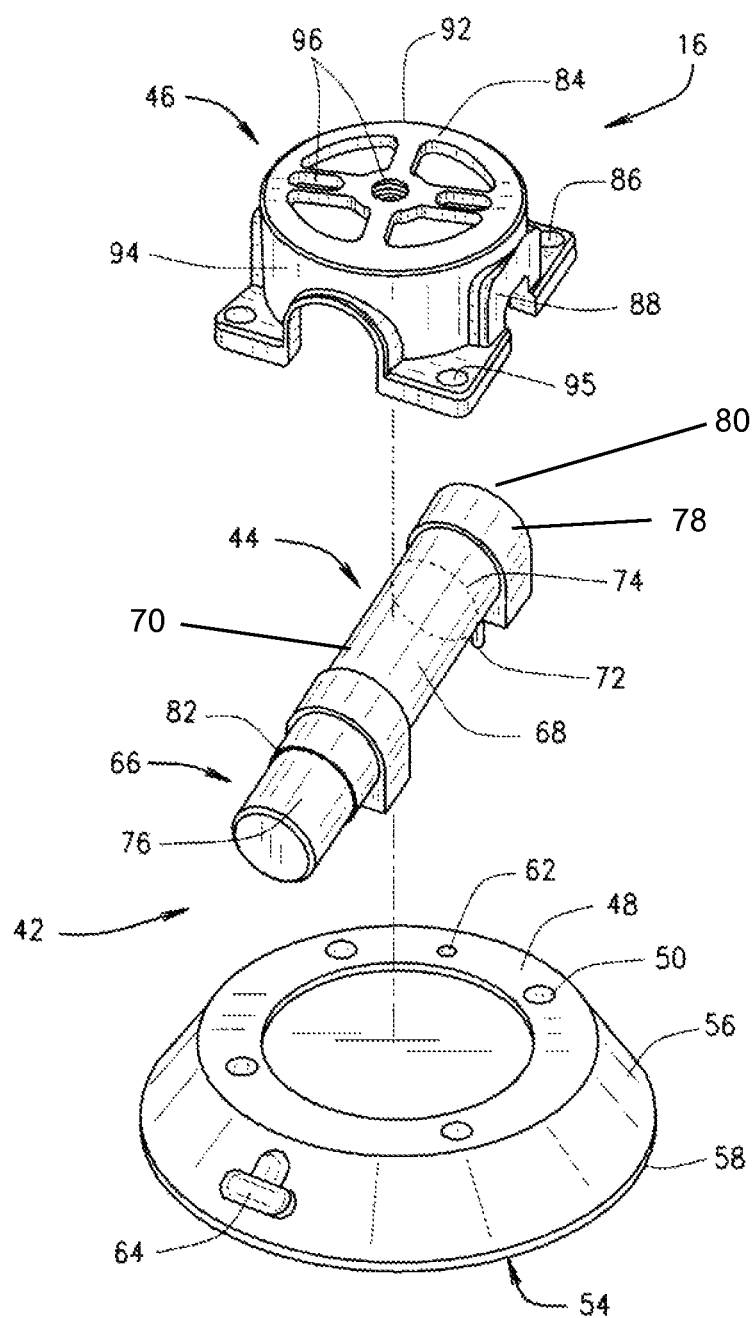
FIG. 3 is an exploded view of a vacuum device.

As shown in FIGS. 1-3, an embodiment of the present disclosure, generally referred to as a carrier system 10, includes a frame member 12, a mount 14 attached to the frame member 12 that is sized and shaped to couple with recreational articles, and vacuum devices 16 attached to the frame member 12 that can detachably attach to a mounting surface 17 of a vehicle. The carrier system 10 can couple with any recreational article, including, but not limited to, a bicycle, skis, a snowboard, a surfboard, a canoe, or a kayak.

The frame 12 is generally a linear bar 18 with enlarged generally circular portions 20 at each end that are each sized and shaped to mate with respective vacuum devices 16. (FIG. 3). However, the portions 20 can be any shape and size capable of mating with the vacuum device 16. In the embodiment of FIGS. 1-3, the frame 12 mates with two vacuum devices 16, such as with fasteners 13, to provide enough vacuum strength to withstand the tensions, shear, and other forces on the carrier system 10 during operation. Multiple vacuum devices 16 help stabilize the load and provide redundancy should one or more vacuum device 16 fail. A security member 22, such as a C-shaped handle, extends from the frame 12 so that an attachment member 1500, such as a tether, rope, cord, cable, or other member, along with a lock 1502, can attach between the security member 22 and the vehicle, preferably with a security clip 1504, which is described in more detail below. (FIG. 18-21). When secured to the vehicle, the security member 22 acts as a theft deterrent. Preferably, the frame 12 is constructed from a material capable of handling the loads and tensions occurring during operation of the carrier system, such as metal, fiberglass, plastic, or other suitable materials.

The mount 14 includes an attachment member 24 that attaches to the outer face 26 of the frame 12, such as by welding, adhesive, fasteners, or other appropriate means (FIGS. 1-2). Extending from the attachment member 24 is a skewer assembly 28 sized and shaped to couple with front or rear fork arms 35 of a bicycle 37. The skewer assembly 28 includes a generally tubular housing 30 that defines a bore 32 along a center axis A-A. (FIG. 1). Generally cylindrical protrusions 34 extend outwardly from each end of the housing 30 along the axis A-A. The protrusions 34 are shaped and sized to mate with the front clevises 36 of the fork arms, which first requires removal of the wheel. To secure the fork arms 35 to the skewer assembly 28, a skewer rod 36 inserts through the bore 32 and secures with a fasteners, such as a nut 38 and a cam clamp 40. The cam clamp 40 can be tightened or loosened to secure and release the fork. Those skilled in the art will recognize that the mount 14 can include any other suitable arrangement that properly secures a recreational article, such as, straps, fasteners, clamps, cables, brackets, tethers, and the like. In addition, the mount 14 can include adaptors that accommodate various fork sizes and models, such as "Fork Up" available from Hurricane Components for 15 mm or 20 mm through-axle models. Also, the rear wheel of the bicycle 37 can be cradled in the rack instead of the front fork so that the front wheel does not need to be removed.

The vacuum devices 16 are similar to the device disclosed in U.S. patent publication No. 2007/0216154, which is hereby incorporated by reference. Each vacuum device 16 includes a vacuum pad 42 and an attached vacuum pump 44 (FIG. 3). A housing 46 attaches to the vacuum pad 42 to enclose and secure the vacuum pump 44 to the vacuum pad 42. The housing is 46 shaped and sized to enclose the vacuum pump 44 while allowing for the attachment of an accessory and likewise to a surface of a vehicle.

The vacuum pad 42 is generally a conical frustum that defines a top face 48 having threaded holes 50 to mount with the housing 46 using fasteners 52. The vacuum pad 42 also includes a recessed vacuum face 54 being generally parallel to the top face 48, a sloped side surface 56 extending between the top face 48 and the vacuum face 54, and a generally circumferential seating edge 58 along the perimeter of the vacuum face 54. In this arrangement, the seating edge 58 can seat with the mounting surface 17 of a vehicle to form a vacuum cavity 60. The vacuum pad 42 defines a channel 62 extending from the top face 48 to the vacuum face 54 and sized to mate with the vacuum pump 44. Release tabs 64 extend outwardly from the side surface 56. The release tabs 64 are generally t-shaped ribs that are shaped and sized to enhance rigidity of the pad 42 and help prevent release of the vacuum device 16 from the mounting surface 17, such as during exposure to warmer temperatures.

Preferably, the pad 42 is made from a flexible material, such as, rubber, or plastic. However, the pad 42 can comprise any material that allows the vacuum pad 42 to seat with the mounting surface 17. Preferably, the material should not be prone to scuffing the mounting surface during installation or operation. In addition, the material can comprise any suitable color and may include other desirable attributes. For example, the pad 42 can be a reflective or glow-in-the-dark material so that it can be seen in dark environments.

The pump 44 includes a generally cylindrical plunger 66 and a hollow cylinder 68 that defines a chamber 70 sized and shaped to receive the plunger 66. The plunger 66 moves within the chamber 70 between a pressed position and a released position to create the vacuum cavity 60 between the vacuum face 54 and the mounting surface 17. The cylinder 68 has an opening to the chamber 70 at one end and is closed at the opposite end. A tube 72 extends generally perpendicularly from the closed end of the cylinder 68. The tube 72 is sized and shaped to insert into the channel 62 of the vacuum pad 42 to provide fluid communication between the cylinder chamber 70 and the vacuum cavity 60. The plunger 66 is sized to insert into the cylinder 68 with a sliding fit that allows the plunger 66 to move back and forth within the cylinder 68. A check valve 74 is positioned within the cylinder chamber 70 in communication with the chamber 70 and the tube 72 so that fluids and gases can only transfer into the tube 72 from outside of the cylinder 68. This allows the vacuum device 16 to be re-pumped without loss of remaining vacuum. In an alternate embodiment, an automatic pump can be used to increase the vacuum level of the vacuum device if it falls below a pre-determined level. In another alternate embodiment, a vacuum device includes a signaling component capable of indicating or sending a signal that indicates a loss of a designated amount of pressure, including, but not limited to, an audio signal, a visual signal, an electronic signal, or a wireless or Bluetooth® signal. For instance, a the signaling component can send a wireless signal to a wireless phone and, in conjunction with appropriate software on the phone, indicate the vacuum pressure.

The plunger 66 is generally a rod with a push button 76 at one end, a seal 78 at the opposite end, and a biasing member 80 therebetween. The seal 78 is sized and shaped to seat against the inner wall of the cylinder 68. When the plunger 66 inserts into the cylinder chamber 70, the biasing member 80 biases the plunger 66 to the released position. The position of the plunger 66 in the released position will vary respective to the amount of vacuum pressure within the vacuum cavity 60.

An indicator 82 positioned about the lower portion of the push button 76 indicates to the operator the relative amount of vacuum pressure within the vacuum cavity 60. The indicator 82 is a colored ring or sleeve sized and shaped to attach around the lower portion of the push button 76. The indicator 82 can be red, yellow or any color that is easily seen. Additionally, the indicator 82 can be a reflective or glow-in-the-dark material so that it can be seen in dark atmospheres and under water. When no vacuum pressure exists in the vacuum cavity 60, the biasing member 80 extends the plunger 66 to its most extended release position. In this position, the indicator 82 is fully visible. As the pressure increases in the vacuum cavity 60, the force of the vacuum lessens the bias of the biasing member 80, and, in turn, the plunger 66 extends less from the chamber 70 and less of the indicator 82 is visible.

The housing 46 is a generally cylindrical member with a generally rectangular base which includes a top surface 84, bottom surface 86, first side 88, second side 90, third side 92, and pump side 94 (FIG. 3). The bottom surface 86 of the housing 46 defines housing apertures 96 for attachment to the vacuum pad 42 with fasteners. The top surface 84 defines attachment apertures 98 for attachment of accessories with appropriate means, such as fasteners, straps, and other suitable members. Although, housing apertures 96 and attachment apertures 98 are shown on top side 84 of housing 46, those skilled in the art will recognize that housing apertures 96 and attachment apertures 98 can be located on any side 88, 90, 92, 94 of the housing 46. Also, the housing apertures 96 and attachment apertures 98 can be holes, slots, or any other configuration sized and shaped to accommodate different dimensions of various manufacturers' accessories.

The housing 46 can be made from a variety of materials, including marine grade stainless steel, powder-coated aluminum, rubber or plastic.

In operation, an operator places the vacuum face 54 of pad 42 against a mounting surface 17 of a vehicle, which creates a vacuum cavity 60 between the vacuum face 54 of the pad 42 and mounting surface 17. This embodiment is preferably used with a pick up truck, with the mounting surface comprising the rear window of the truck. The operator repeatedly pushes the plunger 44 from the released position to the pressed position to remove fluid (air, gas, and/or water) from the vacuum cavity 60, thereby, reducing the pressure below the pressure the surrounding atmospheric pressure. This creates a vacuum such that edge 58 and vacuum face 54 of pad 42 seat against the mounting surface 17. A vacuum exists whenever the pressure within the space is less than the pressure that surrounds it. To obtain an adequate vacuum for operation, the operator should repeatedly press the plunger 66 until the indicator 82 is no longer visible when the plunger 66 is in the released position. If at any time during operation, the indicator 82 becomes visible indicating a loss of vacuum, the operator can again repeatedly push the plunger 66 until the indicator 82 is no longer visible.

Once the carrier system 10 is attached to a mounting surface of a vehicle, a recreational device, such as a bicycle can be attached to the mount 14. In FIGS. 1-3, the clevises of the fork arms 35 mate with the protrusions 34 and are secured by inserting and tightening a skewer rod 36. In this position, the rear bicycle wheel rests on the truck bed. When desired, the skewer rod 36 is loosened and the bicycle 37 can be removed.

To release the vacuum and remove the carrier system 10, the operator lifts the release tabs 64 on the side face 56 of pad 42 away from the mounting surface 17. In other embodiments, a valve stem can be activated to release the vacuum device 16. Additionally, a twist button with a course thread located on the top face of the pad 42 can be used to release the vacuum device 16.

As shown in FIG. 4, the carrier system 10 can also include a rear wheel mount 91 for securing the rear wheel of a bicycle 37 while the front of the bicycle 37 is secured to the mount 14. The rear wheel mount 91 is a vacuum device 16 that includes a securing strap 93, such as a hook and loop material strap, for securing the rear wheel of the bicycle 37. Use of the rear wheel mount 91 enhances the securement of the bicycle 37 to mount 14 and prevents the rear wheel of the bicycle 37 from contacting the vehicle.

FIG. 5 illustrates an alternate embodiment of the rear wheel mount 91, which includes a pair of vacuum devices 16 mounted to a support member 95. A pair of securing straps 93, such as a hook and loop material strap, extend from the support member 95 for securing the rear wheel of the bicycle 37. Use of the rear wheel mount 91 enhances the securement of up to two bicycles 37 to mounts 14 and prevents the rear wheel of the bicycles from contacting the vehicle.

The carrier system 10 can also be embodied in the various forms of FIGS. 6-20. For ease of understanding, components common between the alternate embodiments are identified with similar reference numbers, except the reference numbers in the second embodiment include a "100" prefix. For example, the frame of the first embodiment is identified as 12, while a second embodiment with a similar frame is identified as 112. Naturally, any new components are identified with unique reference numbers.

In the first alternate embodiment of FIG. 6, the carrier system 110 is similar to the embodiment of FIGS. 1-3.

However, the frame 112 has a longer linear bar 118 to accommodate the attachment of a mount 114 to each circular portion 120 with fasteners 113. Each circular portion 120 defines arcuate slots 115 shaped and sized to receive the fasteners 113 and provide for attachment of the mounts 114 at a range of angular positions. The mounts 114 should be spaced at an appropriate distance from each other to accommodate the securement of recreational articles to respective mounts. In this way, the carrier 110 can secure two recreational articles within the bed of a pick-up truck.

Figure 7:
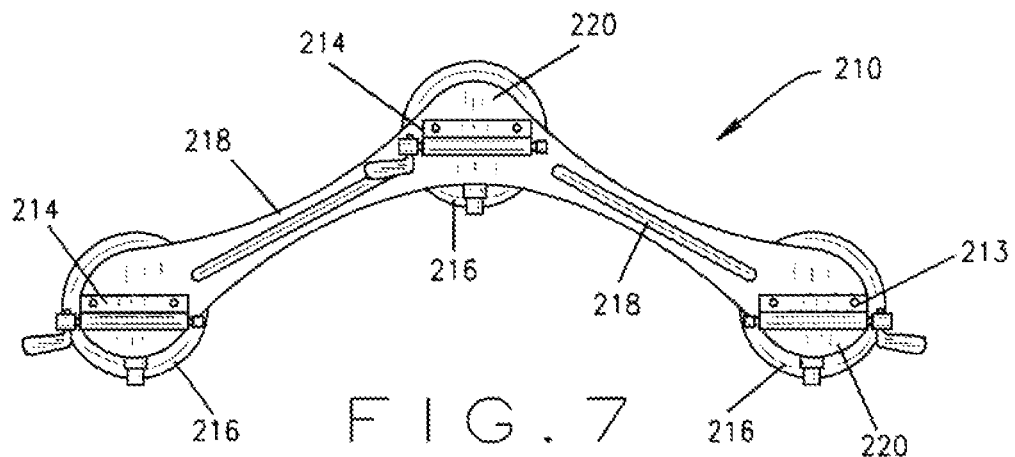
FIG. 7 is a plan view of a second alternate embodiment of the carrier system.

In the second alternate embodiment of FIG. 7, the carrier system 210 is similar to the embodiment of FIGS. 1-3. However, the frame 212 is generally V-shaped having two linear bars 218 extending between three generally enlarged circular portions 220. A vacuum device 216 is attached at each circular portion 220 and a mount 214 is located on the opposite face of each circular portion 220. In this way, the carrier 210 can secure three recreational articles within the bed of a pick-up truck.

Figure 8:
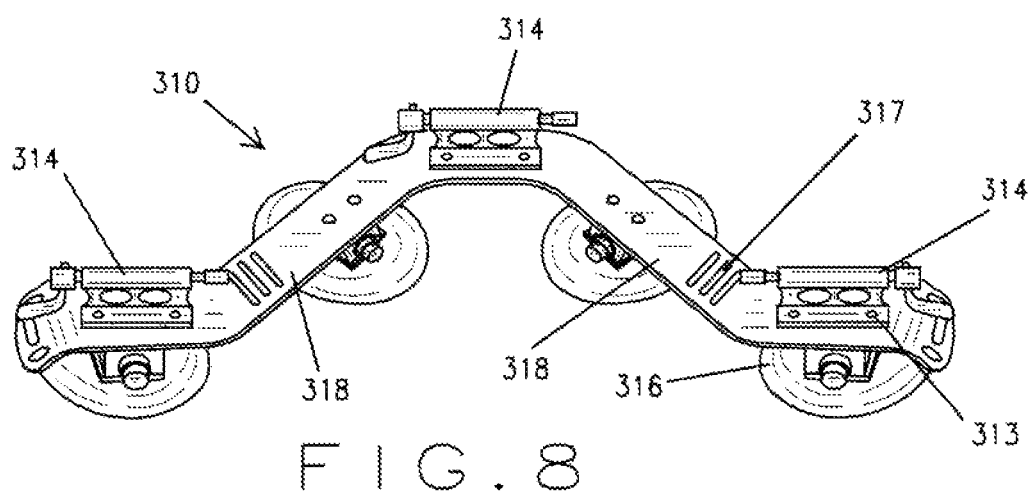
FIG. 8 is a perspective view of a third alternate embodiment of the carrier system.

In the third alternate embodiment of FIG. 8, the carrier system 310 includes a frame 312 that is generally V-shaped having two linear bars 318 extending between three generally rectangular portions 320. The linear bars 318 define slits 317 to enhance the flexibility of the frame 312, which allows the frame 312 to bend to accommodate the curvature of the vehicle. A mount 314 is attached, such as with fasteners 313, to an outer surface of each rectangular portion 320. A vacuum device 316 is attached to the inner surface of the two outer rectangular portions 320. Two more vacuum devices 316 are attached, such as with fasteners 313, to the inner surface of respective linear bars 318. In this way, the carrier 310 can secure up to three recreational articles preferably to a rear window or trunk of a vehicle.

Figure 9:
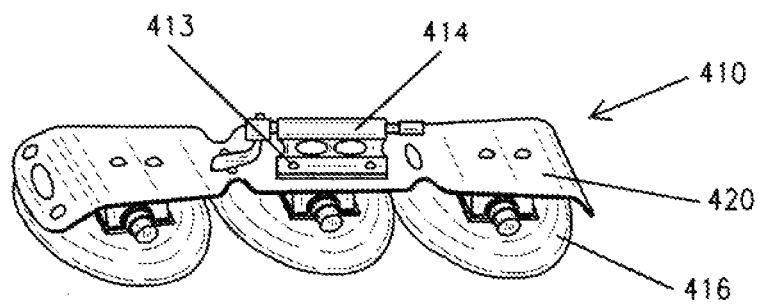
FIG. 9 is a perspective view of a fourth alternate embodiment of the carrier system.

In the fourth alternate embodiment of FIG. 9, the carrier system 410 includes a frame 412 having three generally rectangular portions 420 arranged in a generally linear pattern. The rectangular portions 420 are connected by a segments 421 that define slits 417 to enhance the flexibility of the frame 412, which allows the frame 412 to bend to accommodate the curvature of the vehicle. A mount 414 is attached, such as with fasteners 413, to an outer surface of the center rectangular portion 420. A vacuum device 416 is attached to the inner surface of the each rectangular portion 420. In this way, the carrier 410 can secure a recreational article preferably to a rear window or trunk of a vehicle.

Figure 10:
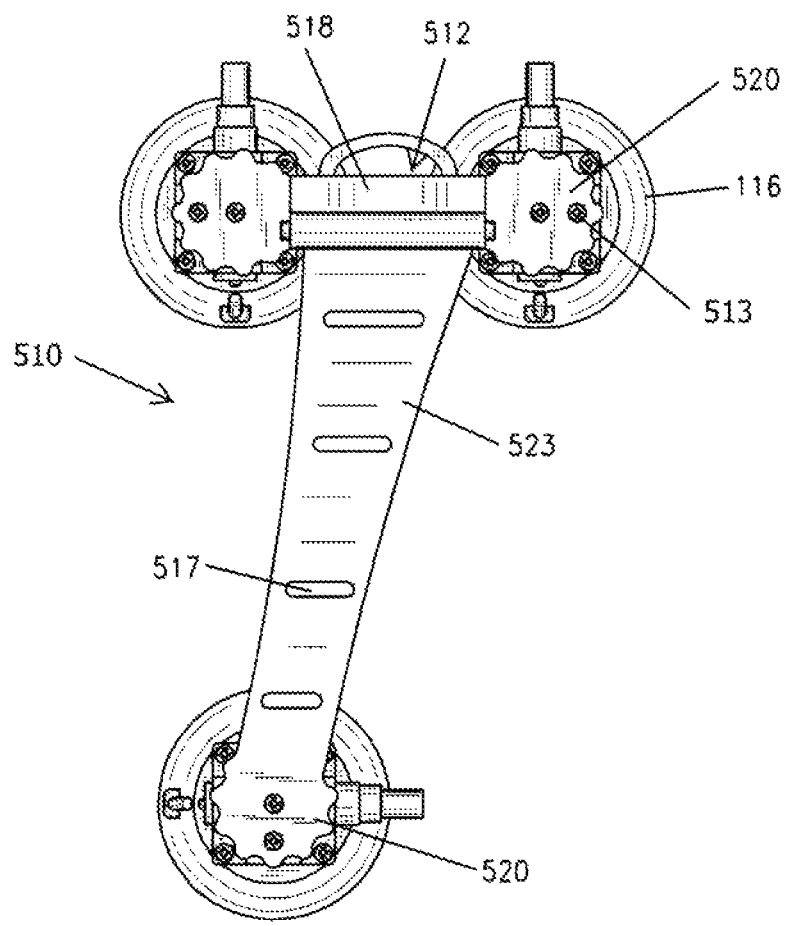
FIG. 10 is a plan view of a fifth alternate embodiment of the carrier system.

In the fifth alternate embodiment of FIG. 10, the carrier system 510 is similar to the embodiment of FIGS. 1-3. However, the frame 512 has a second linear bar 523 extending generally downward and preferably at an angle of about 10° relative to the first linear bar 518, and terminating in a generally circular portion 520. Slits 517 are defined at about equally spaced locations along the frame 512 to enhance the flexibility of the frame 512, which allows the frame to bend to accommodate the curvature of the vehicle roof. In this way, the carrier 410 can secure a recreational article preferably to a rear window or trunk of a vehicle, preferably, with the two upper vacuum devices 116 secured on the roof and the lower vacuum device 116 secured to the front windshield in view of the driver for monitoring of the vacuum pressure.

Figure 11:
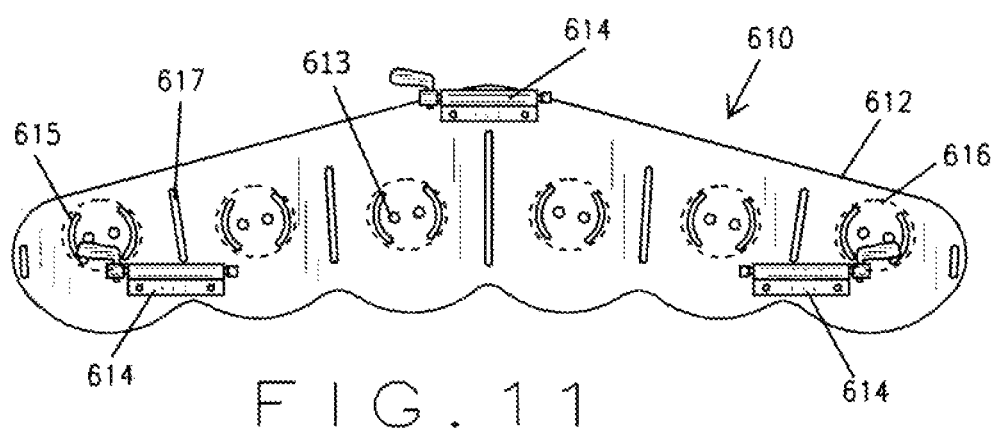
FIG. 11 is a plan view of a sixth alternate embodiment of the carrier system.

In the sixth alternate embodiment of FIG. 11, the carrier system 610 is similar to the embodiment of FIGS. 1-3. However, the frame 612 is a generally wing-shaped plate. A plurality of vacuum devices 616, six are shown in FIG. 11, are attached, such as with fasteners 613, along the length of the frame 612 so that the carrier system 610 can attach to the roof of a vehicle. The frame 612 defines arcuate slots 615 shaped and sized to receive the fasteners 613 and provide for attachment of the mounts 614 at a range of angular positions. Three mounts 614 are attached to the plate in a generally triangular arrangement to accommodate three bicycles. Three rear wheel mounts 91 are individually attached to the roof of a vehicle at a location to allow each rear wheel mount 91 to secure respective rear tires of each bicycle 637. In this way, the carrier 610 can secure three recreational articles preferably on the roof of a vehicle. Slits 617 are defined at about equally spaced locations along the frame 612 to enhance the flexibility of the frame 612, which allows the frame to bend to accommodate the curvature of the vehicle roof. The frame 612 can include a hinge to allow the frame to fold in half. If desired, the frame 612 is large enough to accommodate additional devices, such as, additional mounts, a front wheel holder, or attachments for other devices.

Figure 12:
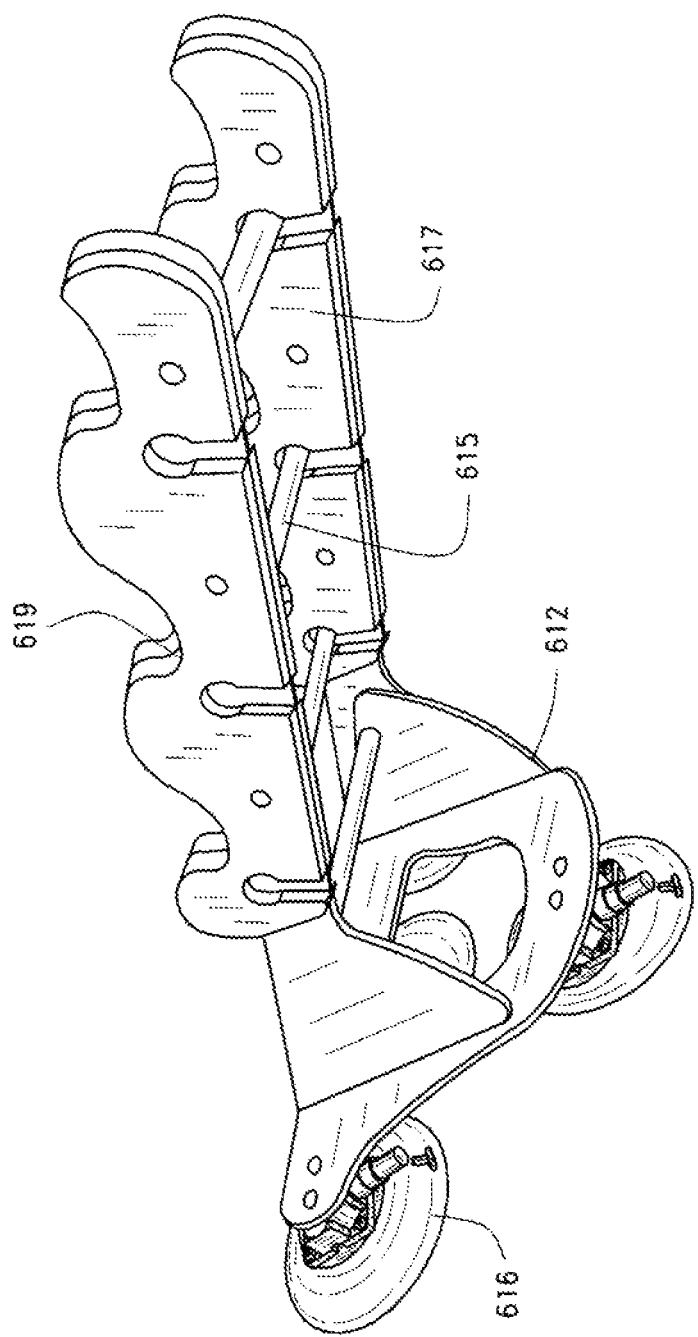
FIG. 12 is a perspective view of a seventh embodiment of the carrier system.

In the seventh alternate embodiment of FIG. 12, the frame 712 includes a generally triangular shaped portion 741 with a rearwardly extending ladder shaped portion 743. The ladder shaped portion 743 is angularly adjustable relative to the triangular shaped portion 741 to accommodate for different arrangements of vehicles and windshields. The ladder-shaped portion has two side members 745 connected by a plurality of crossbars 751. Cradle members 753 are attached along the lower portion 755 of each side member 745. Each cradle member 753 defines recesses 757 that are sized and shaped to receive the frame of a recreational article, such as a bicycle. Each recess 757 is positioned slightly forwardly and above of corresponding crossbar 751. This arrangement allows the operator to secure the frame of the bicycle to a respective crossbar 751 using a strap, tether or other securing member. In other words, the crossbars 751 are positioned to the rear and below of the each recess 757 so that the strap or other securing member pulls the bicycle into the deepest section of the recess 757. In this way, the carrier 710 can secure up to three recreational articles preferably to a rear window or trunk of a vehicle.

Figure 13:
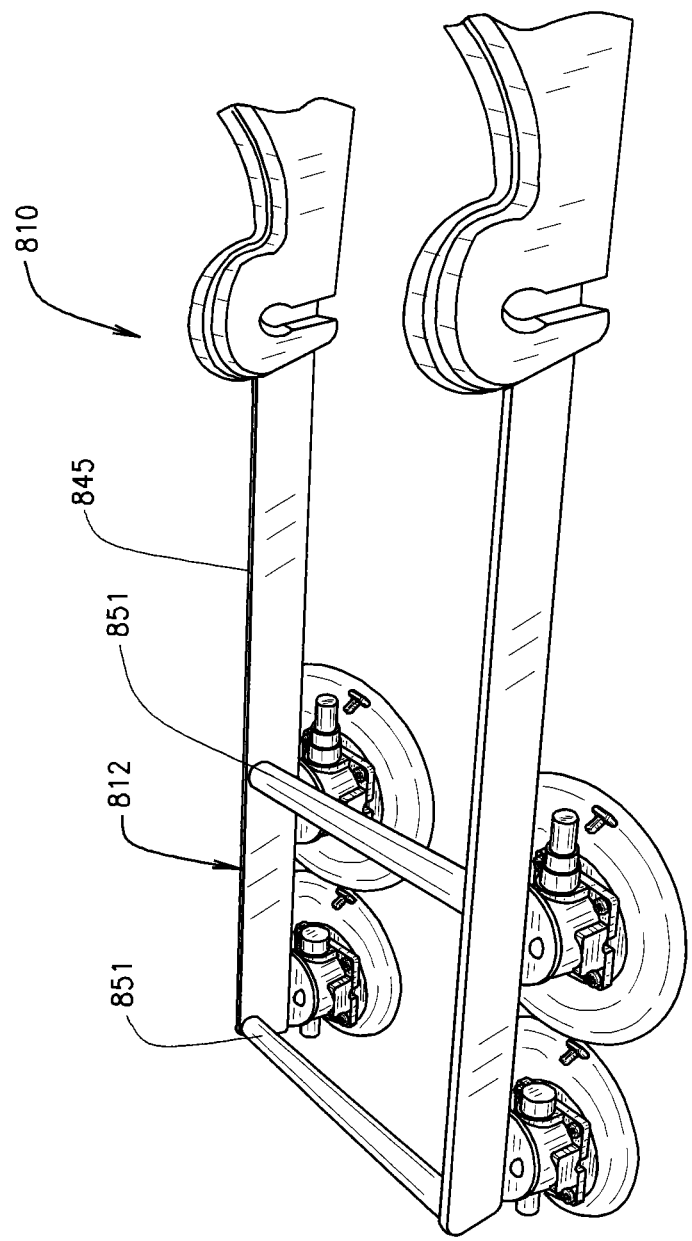
FIG. 13 is a perspective view of an eighth embodiment of the carrier system.

In the eighth alternate embodiment of FIG. 13, the frame 812 is generally ladder-shaped having two side members 845 connected by a plurality of crossbars 851. Vacuum devices 816 are attached at the upper portion of the frame 812 at each intersection of the side members 845 and crossbars 854 for attachment to the rear of a vehicle. Cradle members 853 are attached along the lower portion of each side member 845. Each cradle member 853 defines recesses 857 that are sized and shaped to receive the frame of a recreational article, such as a bicycle. Each recess 857 is positioned slightly forwardly and above of corresponding crossbar 851. This arrangement allows the operator to secure the frame of the bicycle to a respective crossbar 851 using a strap, tether or other securing member. In other words, the crossbars 851 are positioned to the rear and below of the each recess 857 so that the strap or other securing member pulls the bicycle into the deepest section of the recess 857. In this way, the carrier 810 can secure up to three recreational articles preferably to a trunk of a vehicle. If desired, the carrier 810 can include a telescoping support bar that extends from one of the crossbars 854 to the bumper of the vehicle.

Figure 14:
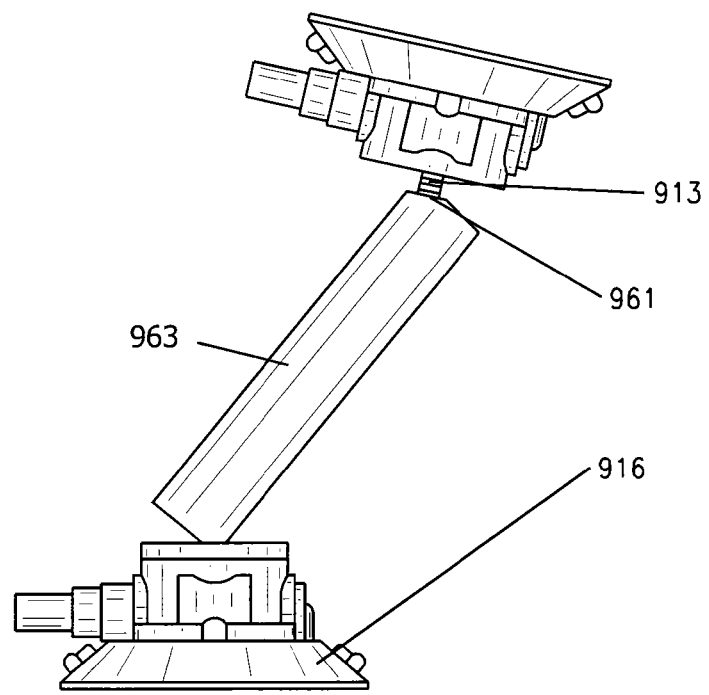
FIG. 14 is a perspective view of a ninth embodiment of the carrier system.

In the ninth alternate embodiment of FIG. 14, a ball mount 961 extends generally perpendicularly from the top of the vacuum device 916. A socket member 963 adjustably attaches to the ball mount 961 with a fastener 913 that allows rotational adjustment between the ball mount 961 and the socket member 963. A second vacuum device 916 attaches to the socket mount 963 for attachment to an electronic device, such as an Ipad®. In operation, the carrier 910 can secure an electronic device preferably to a dashboard of a vehicle.

Figure 15:
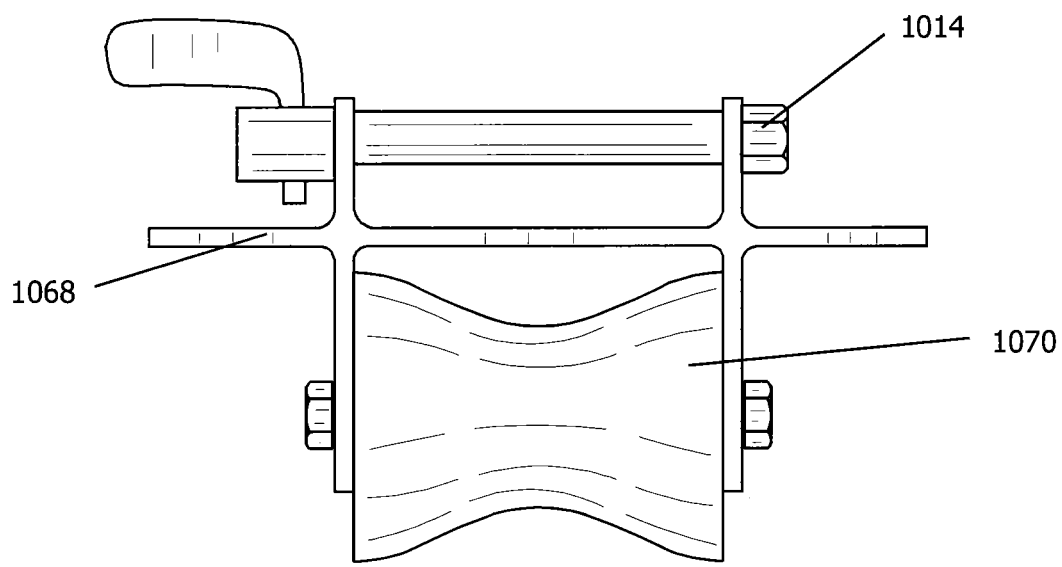
FIG. 15 is a perspective view of a tenth embodiment of the carrier system.

In the tenth alternate embodiment of FIG. 15, the carrier 1010 includes a bracket 1068 for attachment to a mount 14 for the vacuum device 1016, and a roller 1070 pivotally mounted to the bracket 1068. The roller 1072 is shaped and sized to seat against a kayak, canoe, or other vessel, such as an hourglass shape. In this way, the carrier 1010 can secure a recreational article preferably to a roof a vehicle.

In the eleventh alternate embodiment of FIG. 16, the carrier 1110 includes a bracket 1112 for attachment to a mount 1114 for the vacuum device 1116, and a support 1170 mounted to the bracket 1112. The support 1172 is generally V-shaped for seating against a kayak, canoe, or other vessel, such as an hourglass shape. In this way, the carrier 1010 can secure a recreational article preferably to a roof a vehicle.

Figure 17:
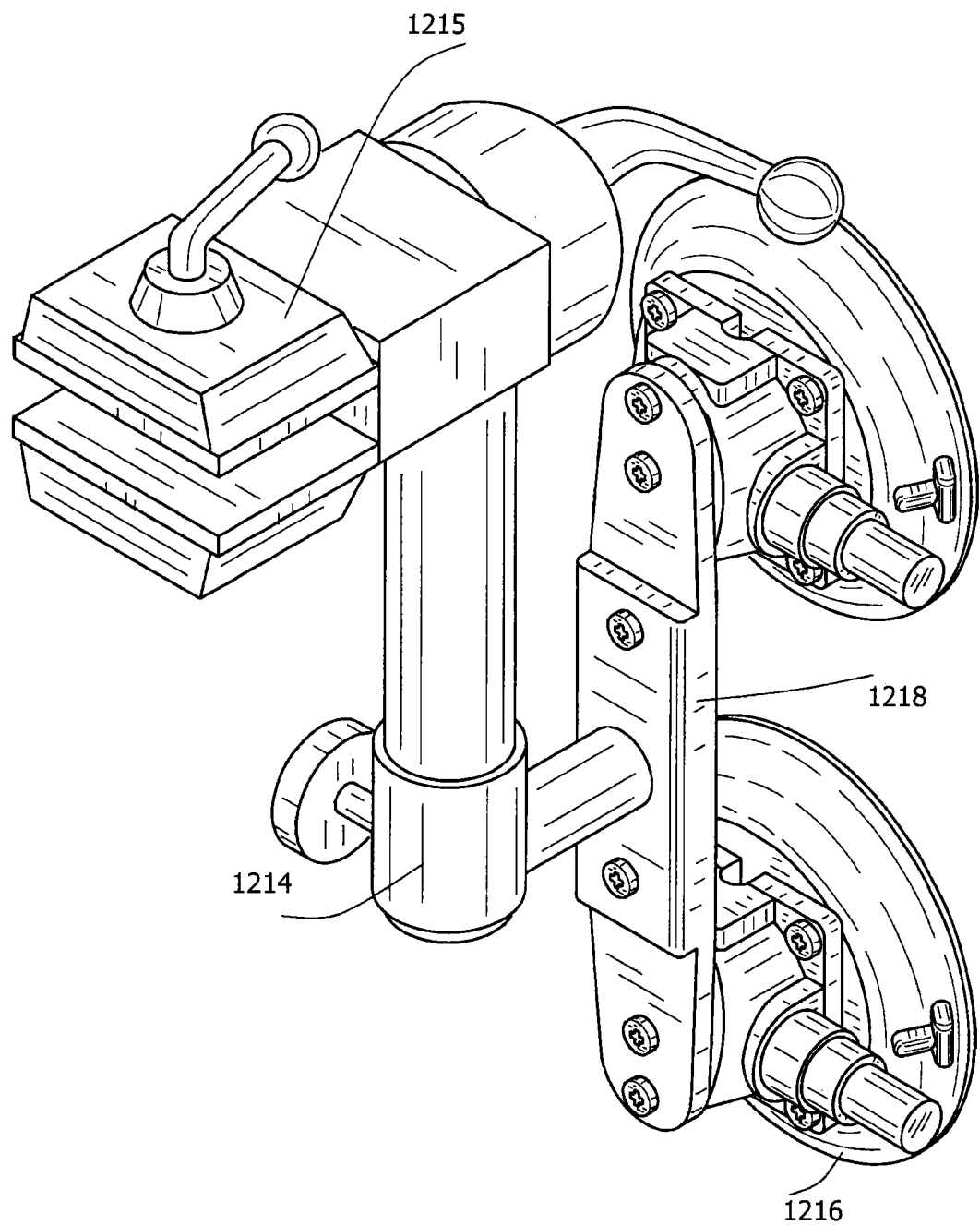
FIG. 17 is a perspective view of a twelfth embodiment of the carrier system.
Figure 20:
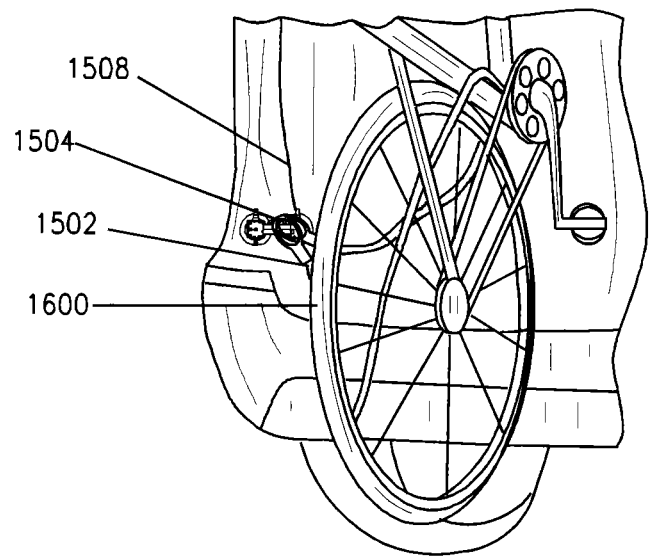
FIG. 20 is a perspective view of a bicycle secured to a vehicle with a locking system.
Figure 21:
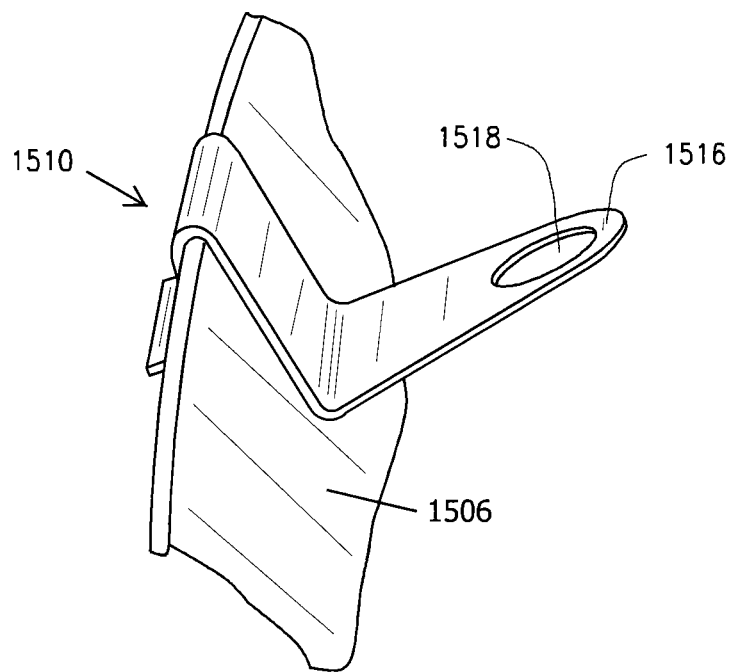
FIG. 21 is a perspective view of the locking clip engaged with a vehicle window.
Figure 23:
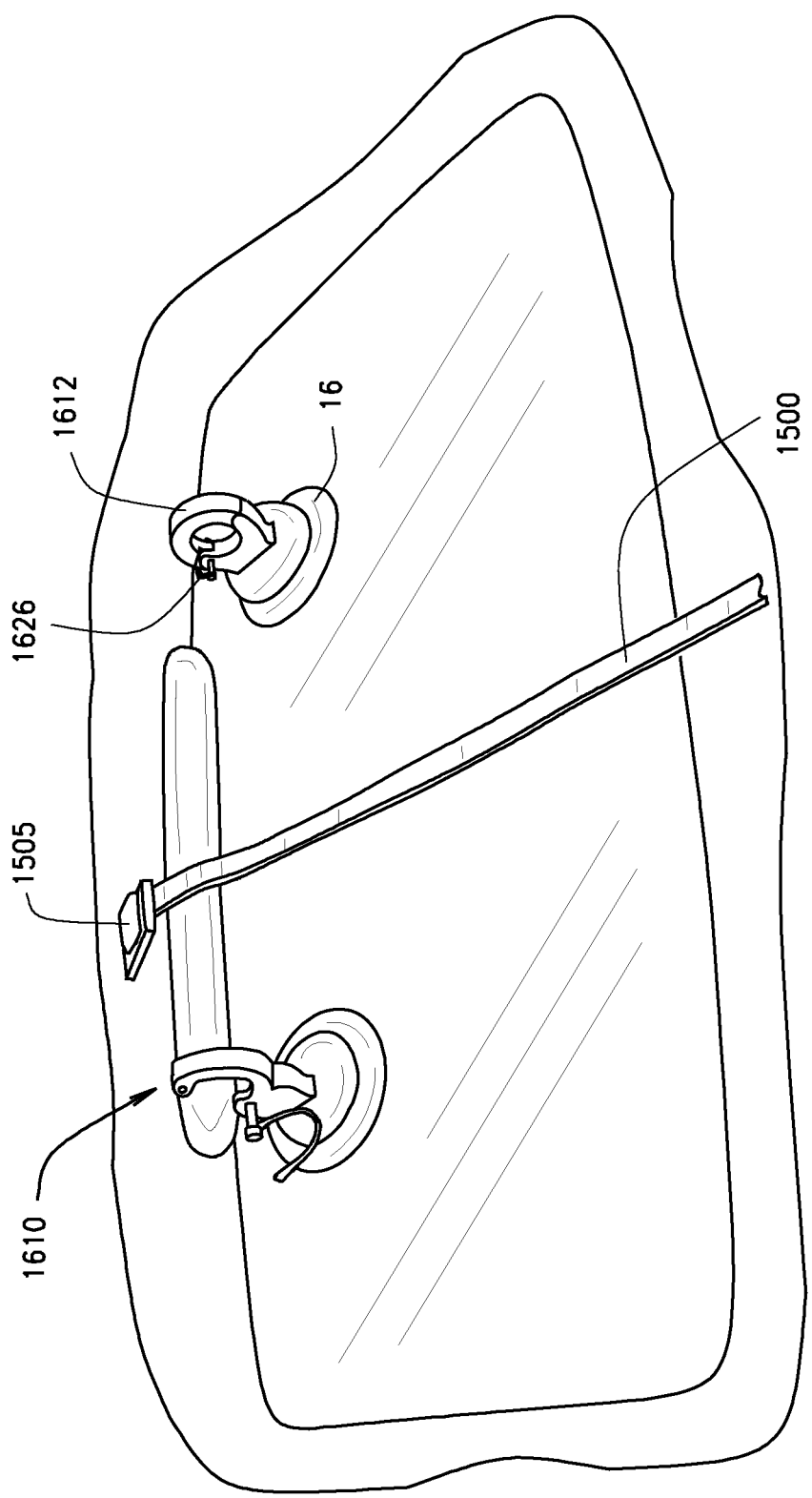
FIG. 23 is a perspective view of a fourteenth embodiment of the carrier system mounted to a vehicle.
Figure 24:
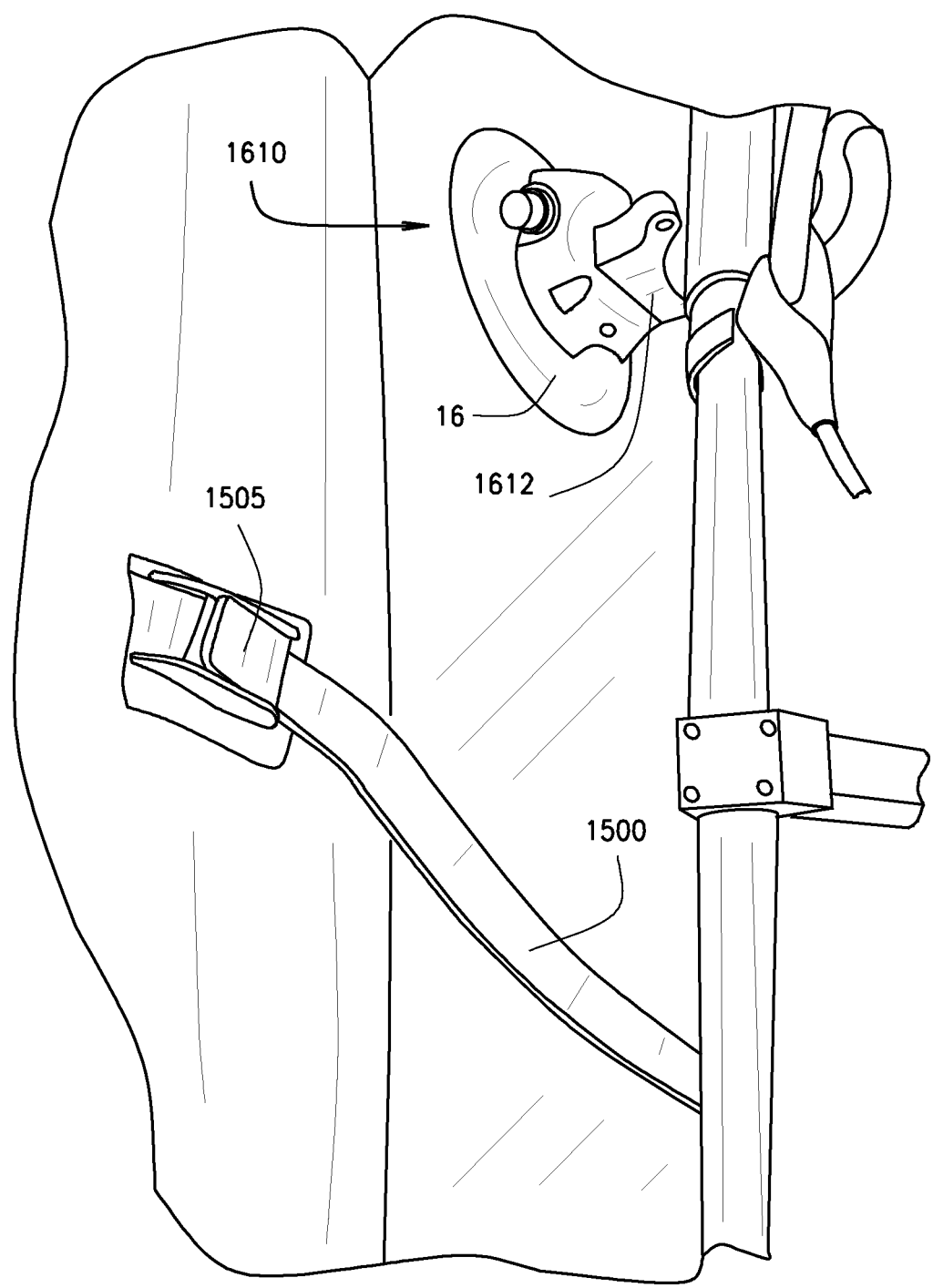
FIG. 24 is a upper perspective view of a fourteenth embodiment of the carrier system mounted to a vehicle and securing a recreational article.
Figure 25:
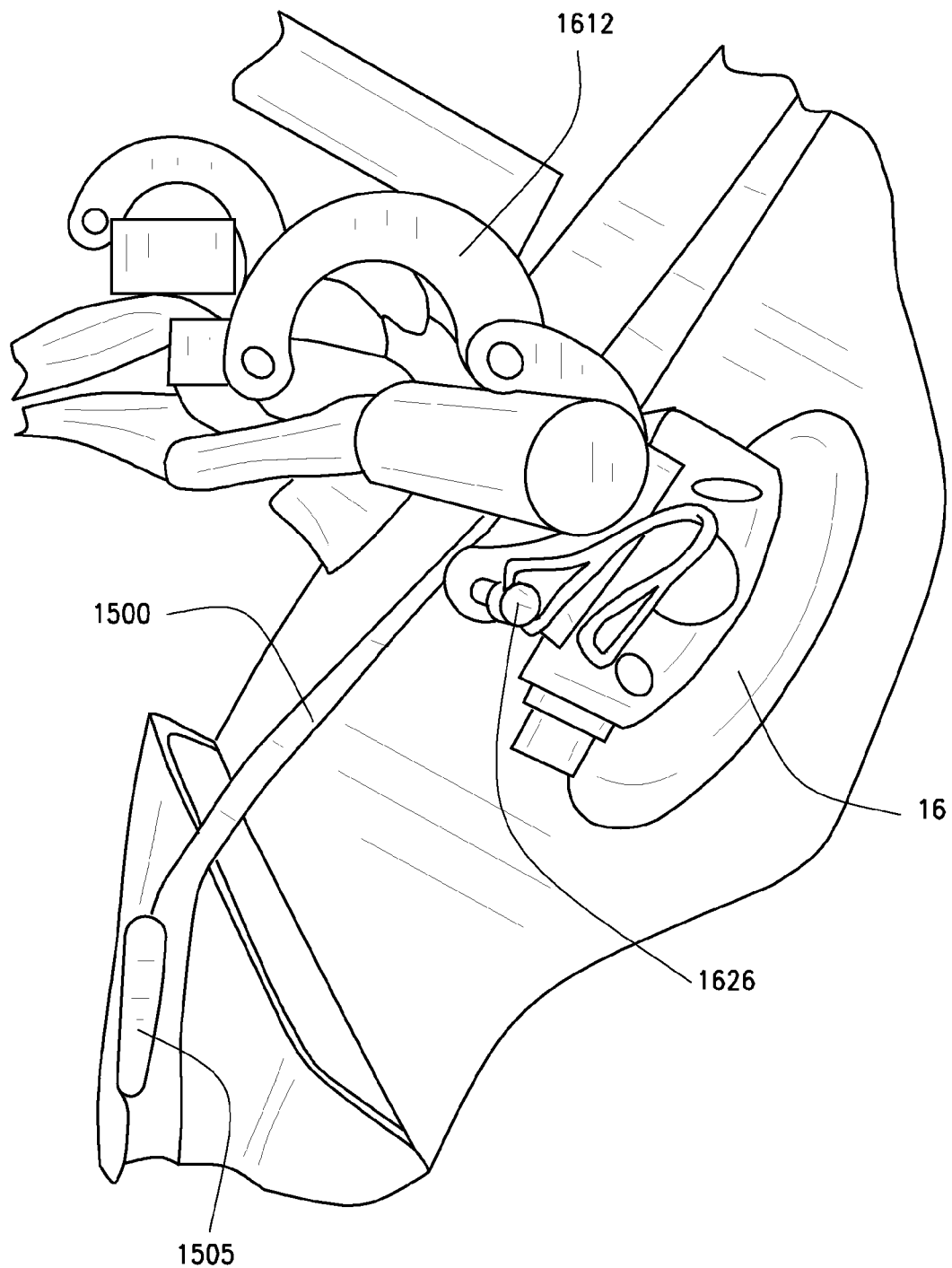
FIG. 25 is a side perspective view of a fourteenth embodiment of the carrier system mounted to a vehicle and securing a recreational article.
Figure 26:
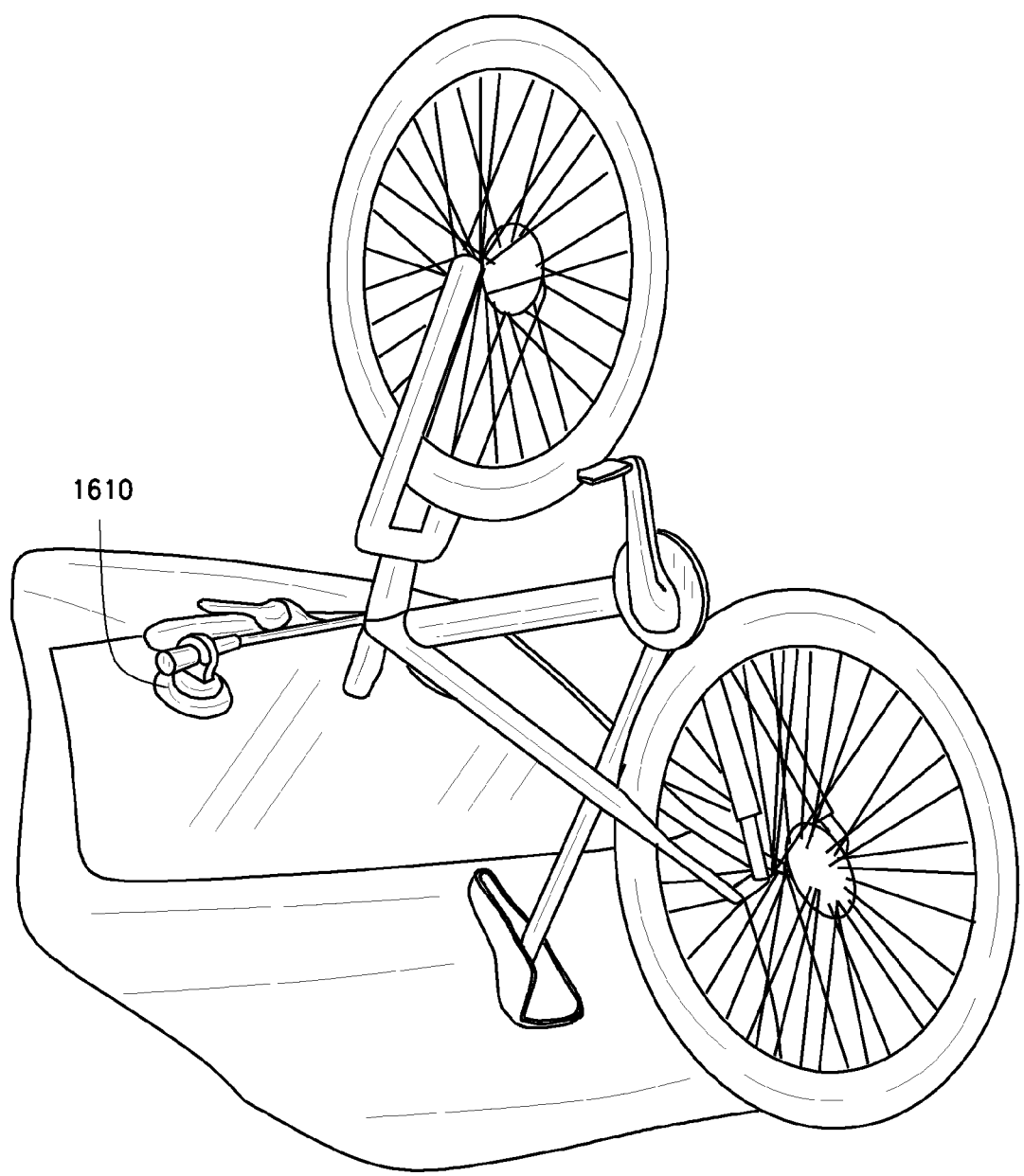
FIG. 26 is a rear perspective view of a fourteenth embodiment of the carrier system mounted to a vehicle and securing a recreational article.
Figure 27:
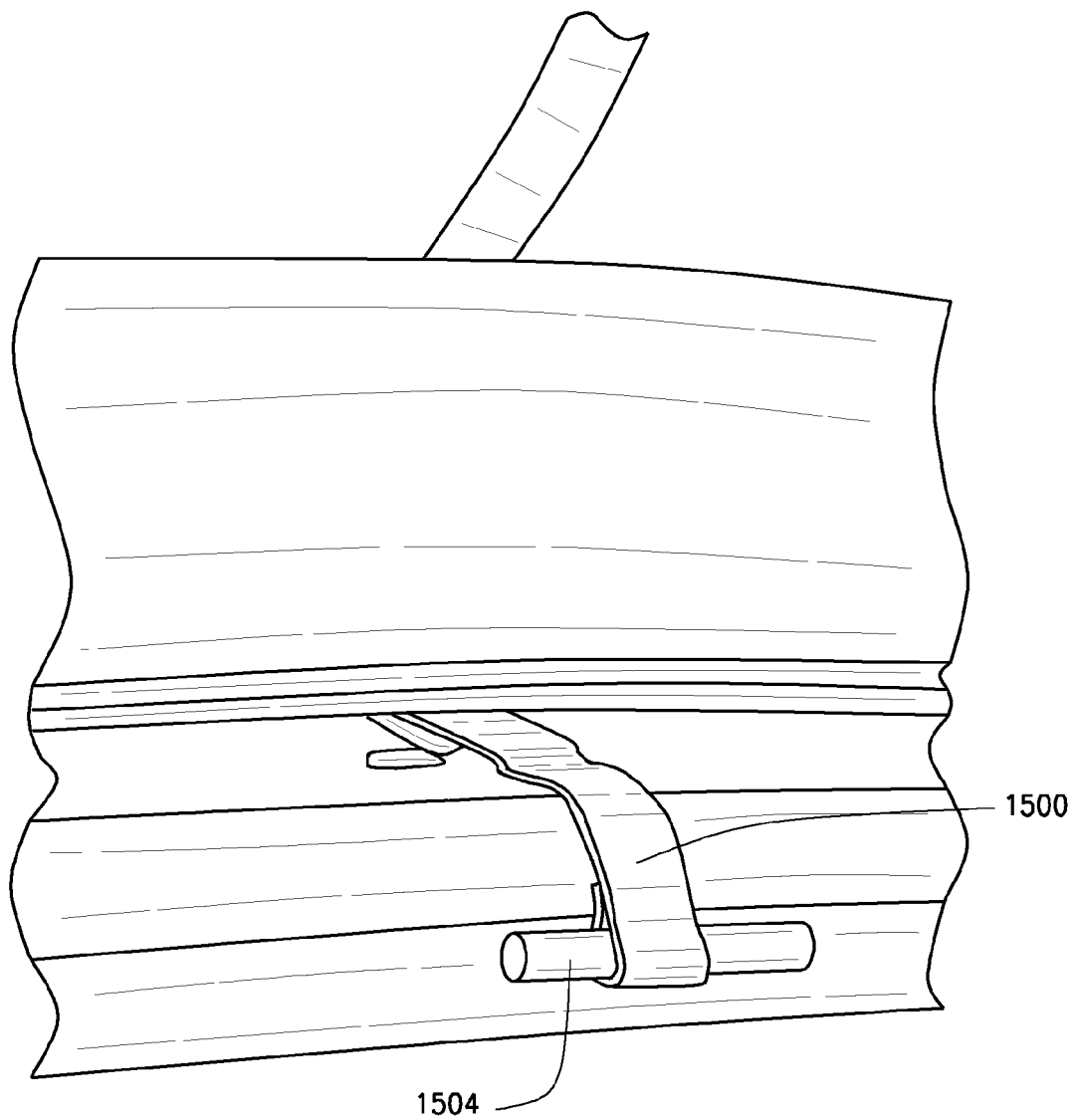
FIG. 27 is an enlarged perspective view of a fourteenth embodiment of the attachment member of the carrier system.
Figure 28:
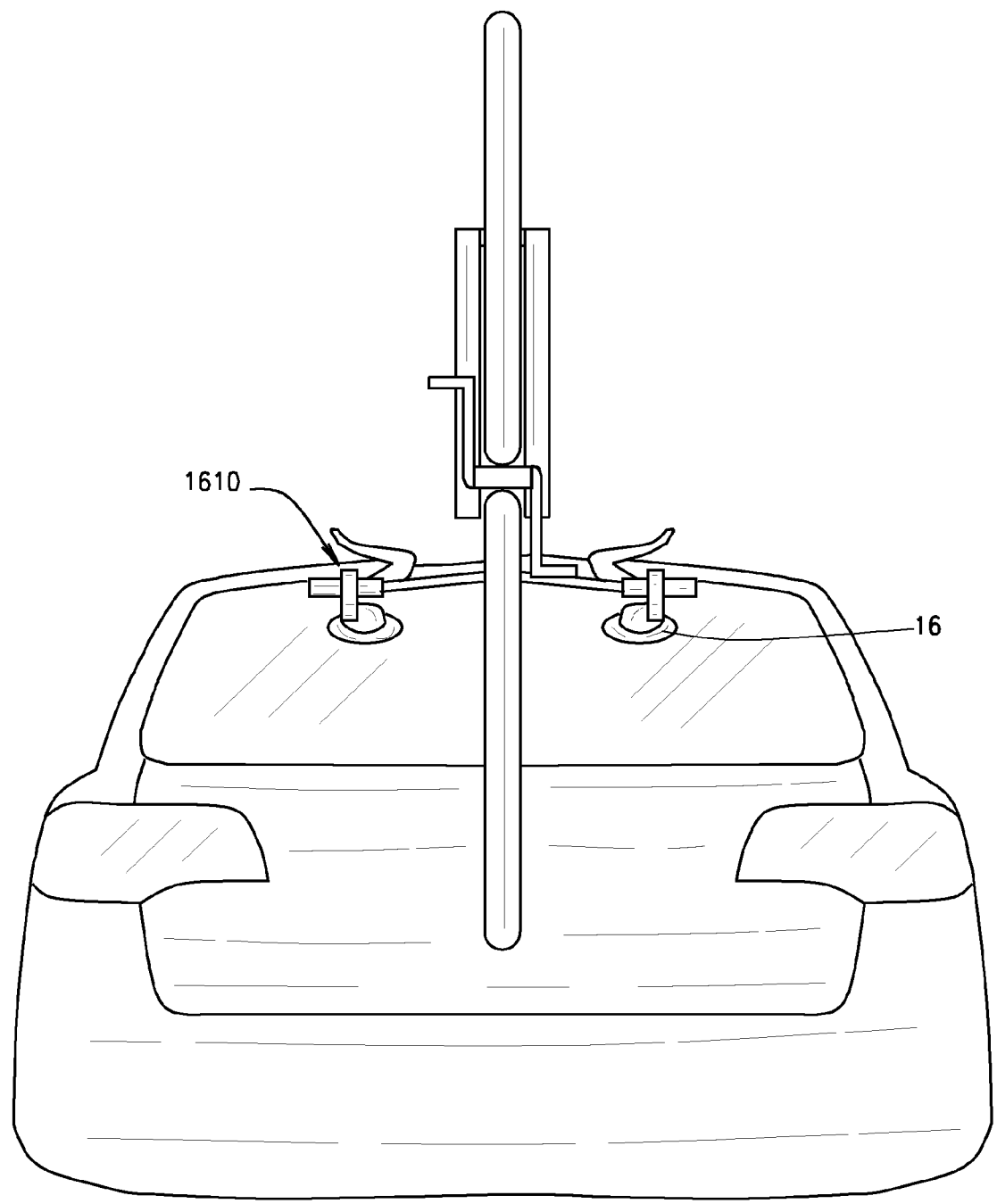
FIG. 28 is a rear view of a fourteenth embodiment of the carrier system mounted to a vehicle and securing a recreational article.
Figure 29:
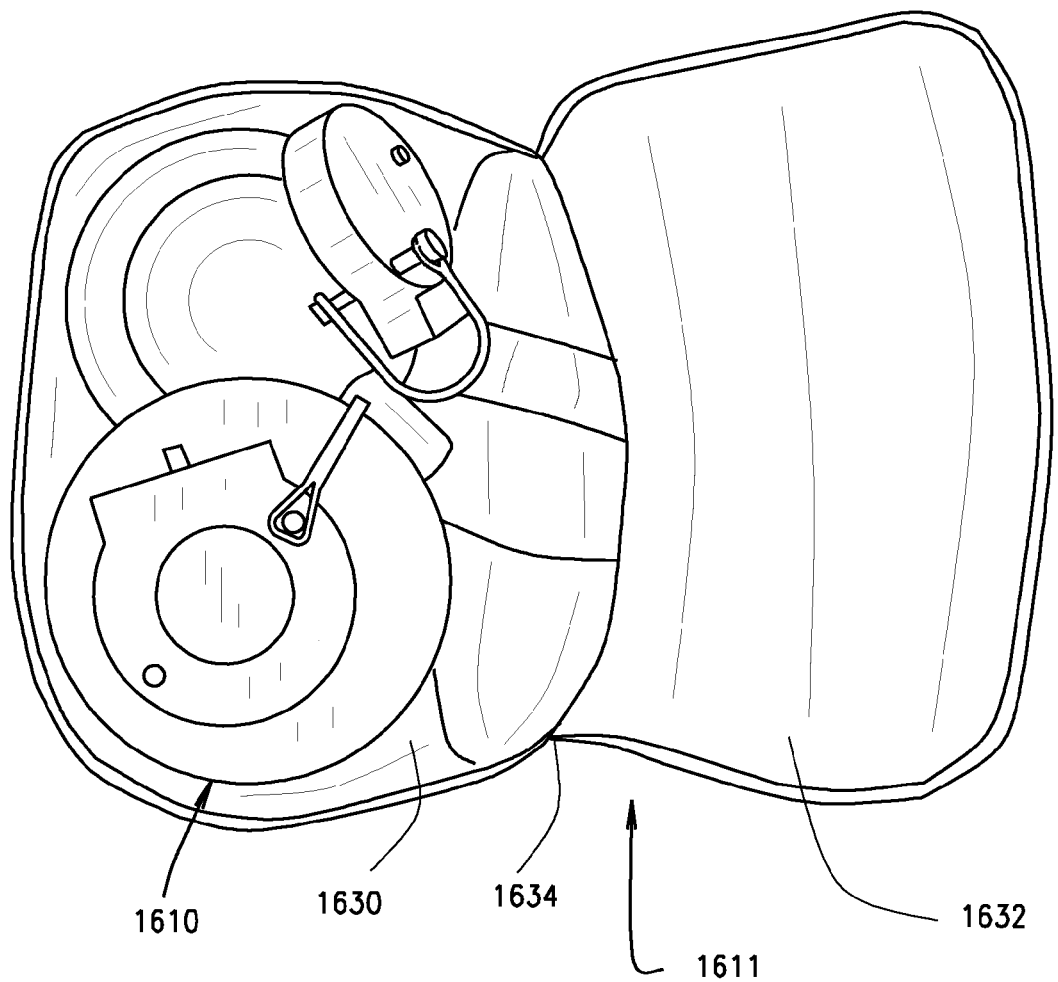
FIG. 29 is a perspective view of a fourteenth embodiment of the carrier system case within a case in an open position.
Figure 30:
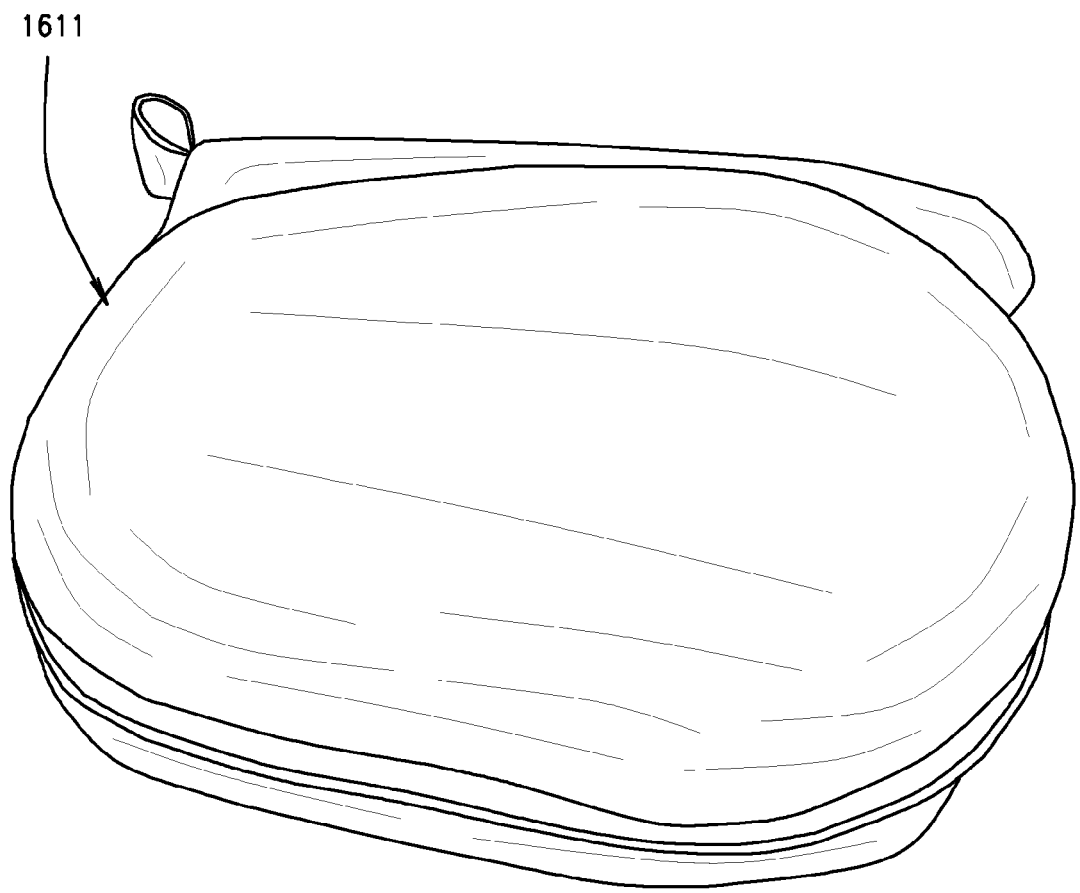
FIG. 30 is a perspective view of a fourteenth embodiment of the carrier system case within a case in a closed position.
Figure 31:
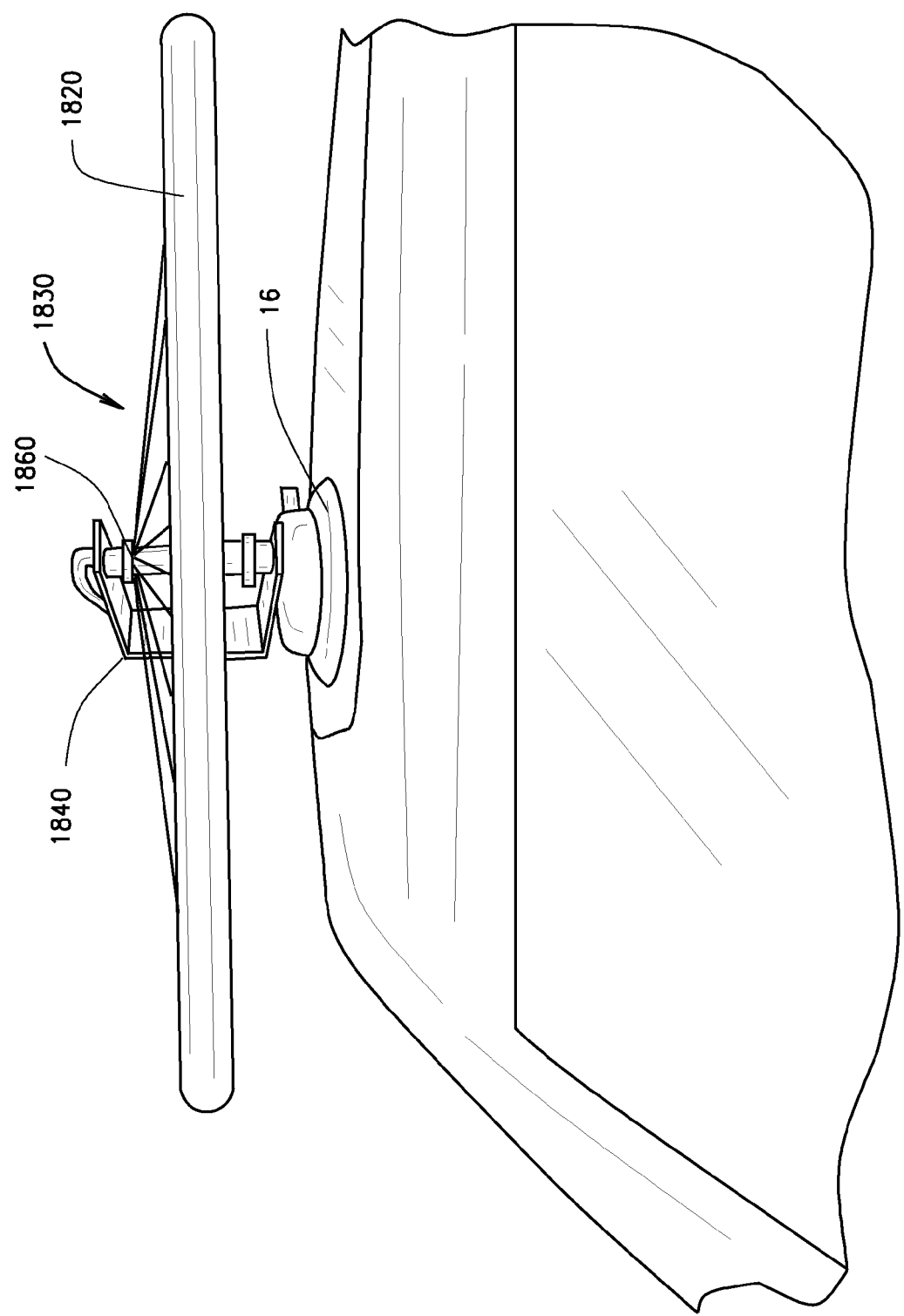
FIG. 31 is a perspective view of a fifteenth embodiment of the carrier system mounted to a roof of a vehicle.
Figure 32:
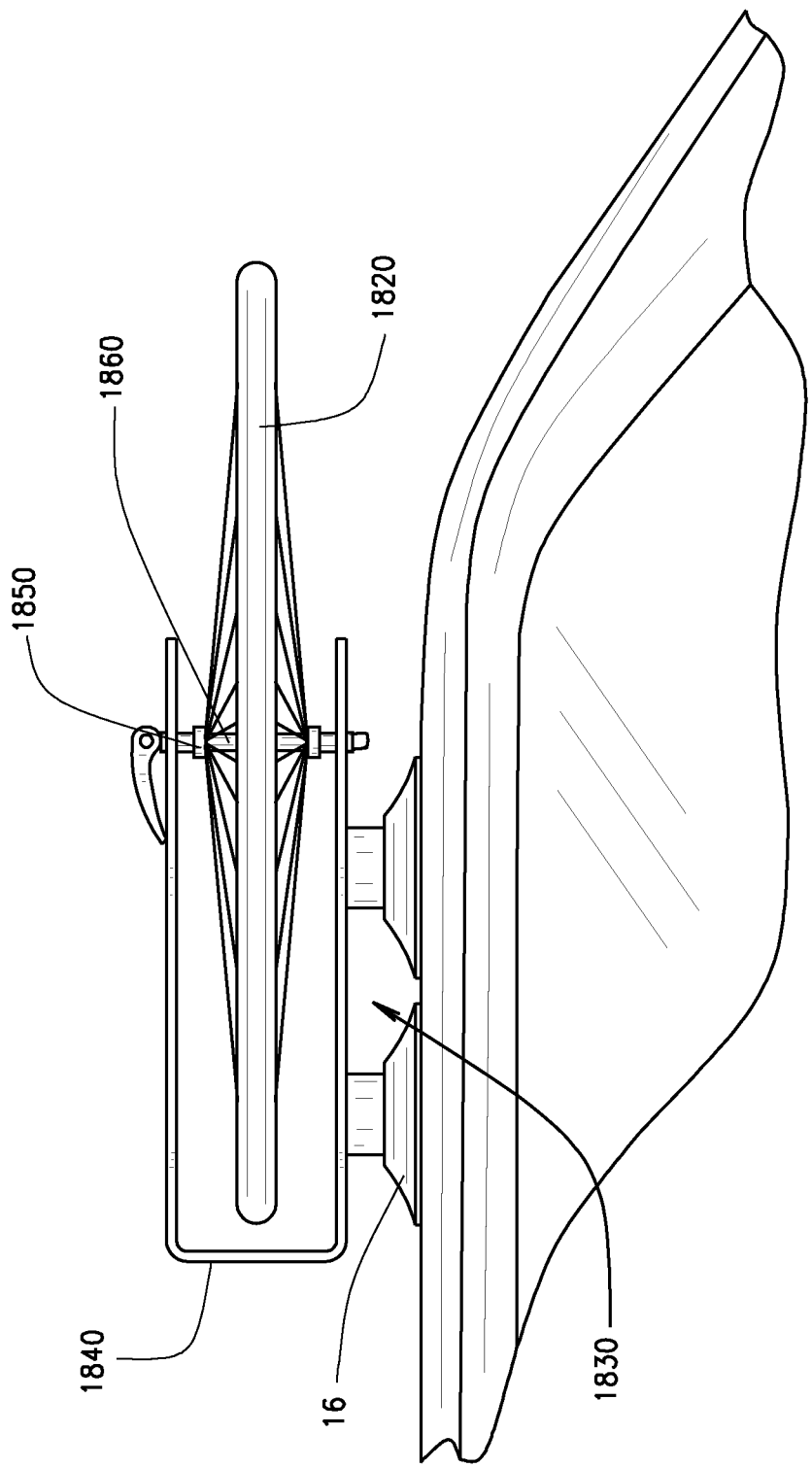
FIG. 32 is another perspective view of a fourteenth embodiment of the carrier system mounted to the roof of a vehicle.
Figure 33:
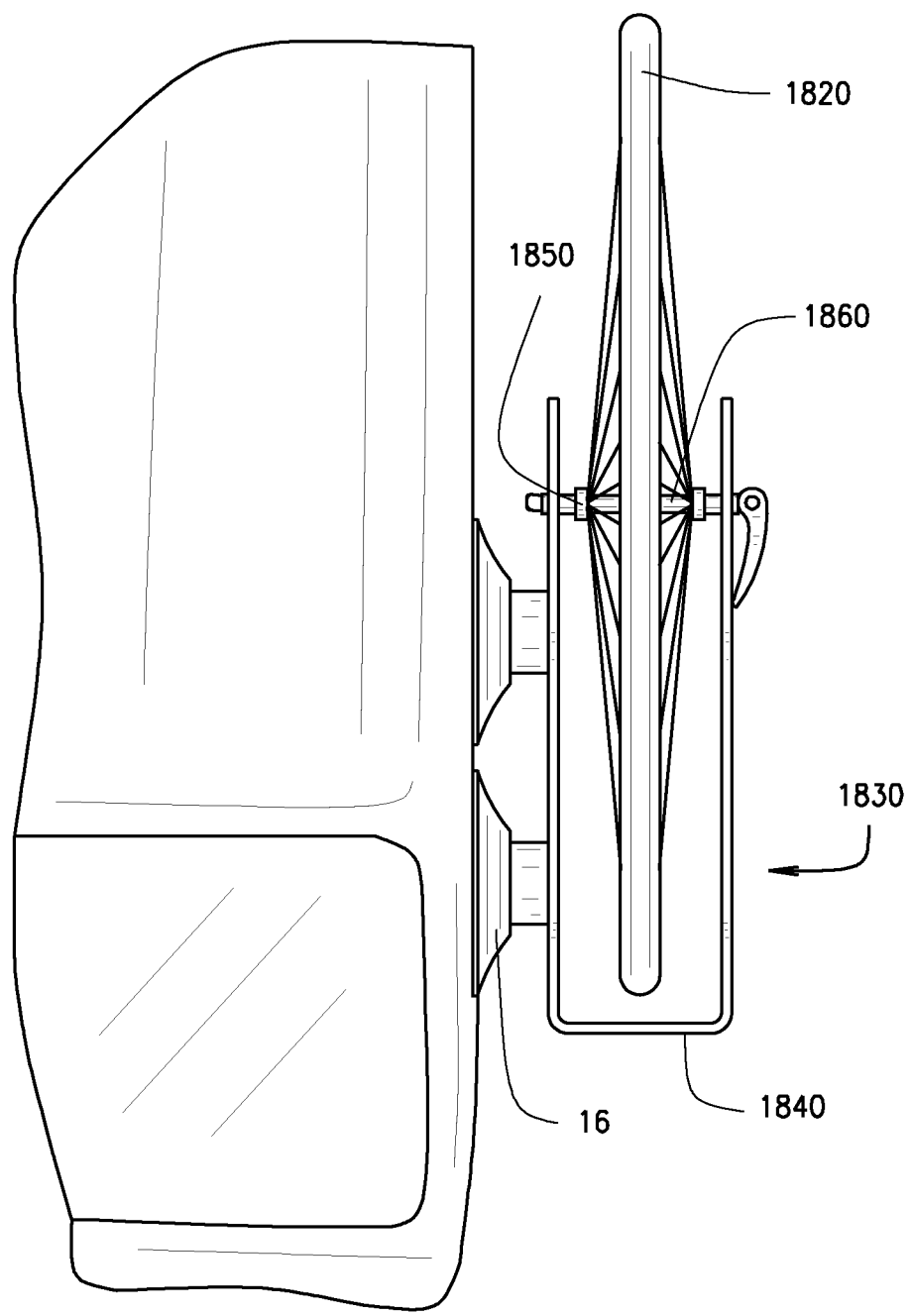
FIG. 33 is a perspective view of a fifteenth embodiment of the carrier system mounted to a side of a vehicle.
Figure 34:
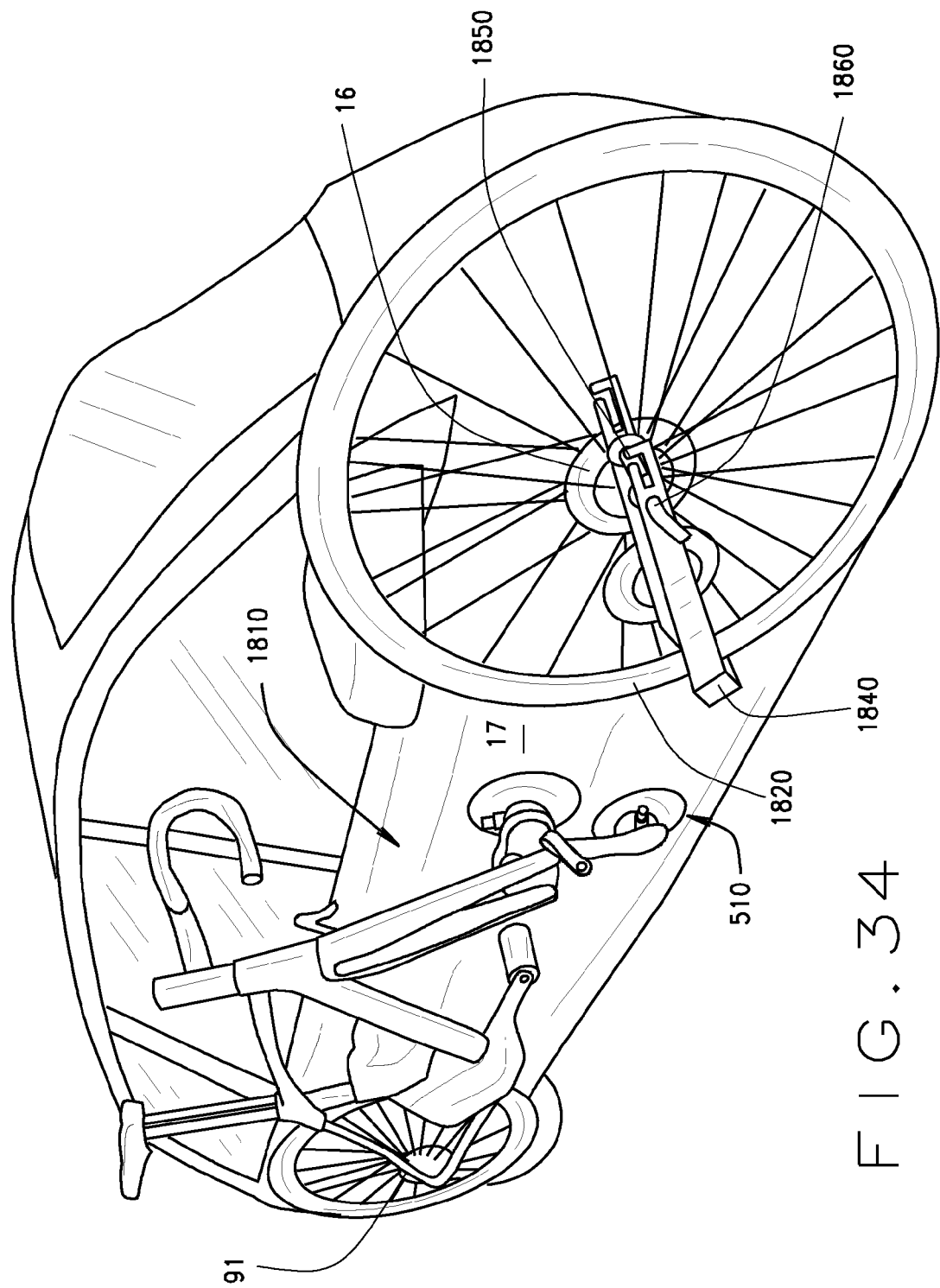
FIG. 34 is another perspective view of a fifteenth embodiment of the carrier system mounted to a side of a vehicle.
Figure 35:
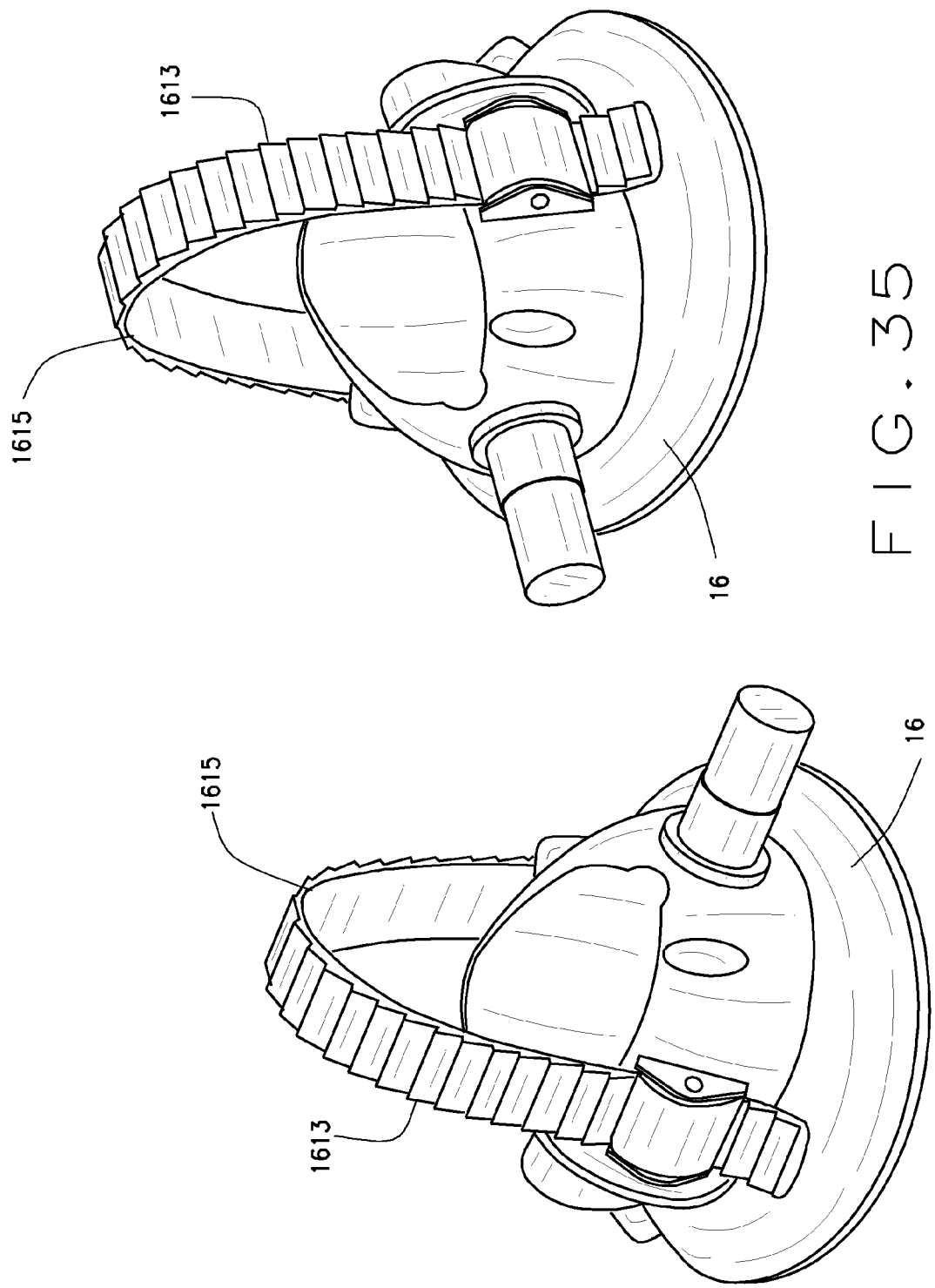
FIG. 35 is a perspective view of a fourteenth embodiment of the carrier system with an alternate clamping mechanism.

In the twelfth alternate embodiment of FIG. 17, the carrier system 1200 is similar to the embodiment of FIGS. 1-3. However, the mount 1214 is an L-shaped tube with a clamp 1215 positioned at the top end for engaging a recreational article. The mount 1214 is vertically adjustable. In this way, the carrier 1210 can secure a recreational article preferably to a rear window or trunk of a vehicle. In addition, the carrier system 1200 could also be used independently from a vehicle as a stand-alone workstand for a recreational article.

In the thirteenth alternate embodiment of FIG. 22, the carrier 1310 includes a support 1312 for attachment to a mount 1314 for the vacuum device 1316, and a support 1370 mounted to the bracket 1312. The support 1372 is shaped and sized to seat against a surfboard or other article. In this way, the carrier 1010 can secure a recreational article preferably to a roof a vehicle.

As mentioned above, the carrier system 10 can include components for deterring theft of the carrier itself and any secured bicycles (FIGS. 18-21). A security clip 1504 is shaped and sized for engagement with a vehicle window 1506 or a vehicle door seam 1508. As shown in FIGS. 18-19, is a bracket having a generally U-shaped segment 1510 defining a recess 1512 sized and shaped to receive a vehicle window 1506 or a vehicle seam 1508, an internal tongue 1514 extending generally perpendicularly from the U-shaped segment, and an opposed external tongue 1516 extending generally perpendicularly from the U-shaped segment 1510. A bumper 1518 attaches to an extended portion of the U-shaped segment 1510. When installed, the recess 1512 receives the vehicle window 1506 so that the bumper seats against the outer surface of the window 1506 and the external tongue 1516 extends outwardly from the window 1506. An attachment member 1500, such as a tether, rope, cord, cable, or other member, along with a lock 1502, can attach between a hole 1518 defined by the external tongue 1516 and the recreational article, such as with a buckle or hook and loop device. If desired, any number of security clips 1504, attachment members 1500, and locks 1502 can be used for added security.

In the fourteenth alternate embodiment of FIG. 23-29, the carrier 1610 is a compact arrangement that can be disassembled and stored within a case 1611 for storage and transport. The carrier 1610 and case 1611 are small enough for a user to carry or transport within a small bag or backpack.

The carrier 1610 includes a pair of vacuum devices 16 that can removeably attach to a mounting surface 17 of a vehicle. A generally annular clamp 1612 removeably attaches to each vacuum device 16 with a fastener 1615, such as a threaded bolt that mates with a female threaded insert 1614 of the vacuum device 16. The clamp 1612 includes a generally C-shaped lower portion 1616 and a corresponding generally C-shaped upper portion 1618 that defines a hole 1620 sized and shaped to receive a recreational article, such as a bicycle handlebar. However, the hole 1620 can be sized and shaped to receive other parts of the recreational article. For example, the clamp can be circular, square, oblong, or other shape. The upper portion 1618 is pivotally attached about A-A at one end to the corresponding end of the lower portion 1616. The opposite ends of the upper portion 1618 and lower portion 1616 define corresponding tabs 1622 and holes 1624, which align to form a continuous bore sized and shaped to receive a security fastener 1626, such as a clevis fastener. In this way, the upper portion 1618 and lower portion 1616 can pivot between an open position to receive the recreational article and a closed position to secure the recreational article. When the recreational article is secured by the clamp 1612, the security fastener 1626 inserts into the aligned bores to secure the assembly. In another embodiment, the clamp is unitary and does not pivot between an open and closed position. Preferably, the clamp 1612 is constructed from a material capable of handling the loads and tensions occurring during operation of the carrier system, such as metal, fiberglass, plastic, or other suitable materials.

Figure 36:
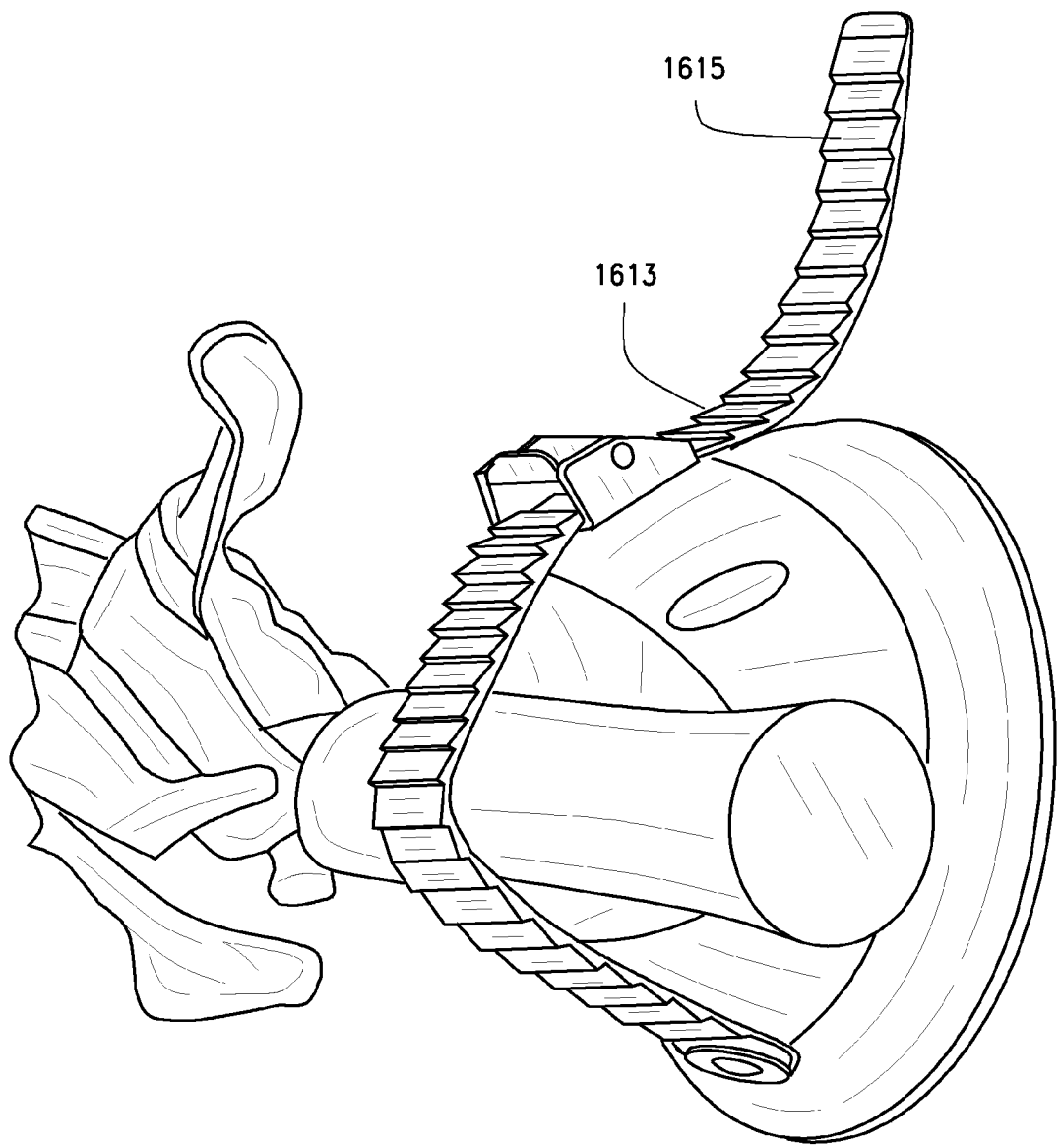
FIG. 36 is a fourteenth embodiment of the carrier system mounted to a vehicle and securing a recreational article with alternate clamping mechanism.

In an alternate embodiment, the annular clamp 1612 can be replaced with any suitable clamping mechanism, preferably a releasable self-locking tie down 1615 (FIGS. 36-37), but also ratchet straps, buckles, cam buckle, over-center buckle, winch, zip tie, self-locking, and the like. In addition, the vacuum device 16 can define a channel 1613 for receiving the recreational article.

An attachment member 1500, such as a tether, rope, cord, cable, or other member, attaches to a security clip 1504 attached at each end, such as with a buckle 1505 or hook and loop device. Each security clip 1504 secures to the vehicle, such as in a vehicle seam, and the attachment member 1500 extends securely through the bicycle, such as through the frame, to prevent removal or theft. When secured to the vehicle, the attachment member 1500 acts as a theft deterrent.

The carrier 1610 can be disassembled by removing each clamp 1612 from the respective vacuum device 16. The generally oblong case 1611 is shaped and sized to receive the dissembled carrier 1610 for storage and transport. The case 1611 includes a first half 1630 pivotally attached to a second half 1632 along a spine 1634 so that it moves from an open position to receive the carrier 1610 and a closed position to secure the carrier 1610 within the case 1611. A suitable fastener, such as a zipper, secures the case 1611 in the closed position. The case 1611 can be made from any suitable material, including, but not limited to, natural or man-made materials, metal, polymer, rubber, or fabric. In addition, the case 1611 can include padding material to protect the carrier 1610 from damage. An alternate embodiment of the case can receive the carrier while still assembled for storage and transport.

The case 1611 can also receive additional accessories or parts. For example, the case 1611 can be configured to receive the carrier 1610 and a connector 1716 for use as a vacuum mount system. The connector 1716 joins the vacuum devices 1714 for securement between a portable electronic device 1700 and a mounting surface 1702, similar that described in International Application PCT/US2012/33803, hereby incorporated by reference. The connector 1716 is a flexible arm having a fastener 1722 at each end, preferably a ¼-20 male insert, however, other fasteners can also be used. For example, a magnetic fastener can be used. The connector 1716 is preferably made of steel and is encased in plastic, such as those readily available in the marketplace. However, any suitable flexible support arm can be used. The fasteners 1722 attach to vacuum devices 1714, such as with ¼-20 female inserts.

In operation, the user removes the carrier 1610 from the case 1611 and assembles the carrier 1610 by attaching the clamps 1612 to respective vacuum devices 16. In operation, an operator places the vacuum face 54 of pad 42 against a mounting surface 17 of a vehicle, which creates a vacuum cavity 60 between the vacuum face 54 of the pad 42 and mounting surface 17. Preferably, the vacuum devices 16 are positioned so that the indicators 82 are in visible by the driver or passenger of the vehicle. FIGS. 24-29 shows the carrier 1610 used with a car, with the mounting surface 17 comprising the rear window of the car. The operator repeatedly pushes the plunger 44 from the released position to the pressed position to remove fluid (air, gas, and/or water) from the vacuum cavity 60, thereby, reducing the pressure below the pressure the surrounding atmospheric pressure. This creates a vacuum such that edge 58 and vacuum face 54 of pad 42 seat against the mounting surface 17. A vacuum exists whenever the pressure within the space is less than the pressure that surrounds it. To obtain an adequate vacuum for operation, the operator should repeatedly press the plunger 66 until the indicator 82 is no longer visible when the plunger 66 is in the released position. If at any time during operation, the indicator 82 becomes visible indicating a loss of vacuum, the operator can again repeatedly push the plunger 66 until the indicator 82 is no longer visible.

Once the carrier system 1610 is attached to a mounting surface of a vehicle, the handlebar of a recreational device, such as a bicycle can be inserted into each clamp 1612 and secured with fasteners 1626. In this position, the bicycle seat rests against the car. The security clip 1504 of the attachment member 1500, secures to the vehicle, such as in a vehicle seam, and the attachment member 1500 extends securely through the bicycle, such as through the frame, to prevent removal or theft.

When desired, the fastener 1626 is removed and the bicycle 37 can be removed from the clamps 1612. To release the vacuum and remove the carrier system 1610, the operator lifts the release tabs 64 on the side face 56 of pad 42 away from the mounting surface 17. In other embodiments, a valve stem can be activated to release the vacuum device 16. Additionally, a twist button with a course thread located on the top face of the pad 42 can be used to release the vacuum device 16.

In the fifteenth alternate embodiment of FIGS. 32-35, the carrier 1810 includes one or more of the above described embodiments to removeably attach to a mounting surface 17 of a vehicle 18. In the embodiment of FIGS. 32-35, the recreational article is secured to the side of the vehicle 18 with the fifth alternate embodiment of the carrier system 510 (FIG. 10) secured to the front of the article, and with the rear wheel mount 91 (FIG. 4) attached to the rear of the article. The front wheel 1820 is removed from the article and mounted to the side of the vehicle with an alternate embodiment of the wheel mount 1830. The wheel mount 1830 includes a pair of vacuum devices 16 mounted to a generally U-shaped frame 1840. The ends of the frame define clevises 1850 configured to secure a skewer rod 1860 of the front wheel 1820. The skewer rod 1860 can be tightened or loosened to secure and release the wheel 1820.

In all of the embodiments, the frames are preferably made from a lightweight metal, such as aluminum. However, any suitable material can be used, including, but not limited to, steel, plastic, or composite material. Alternatively, the frame can be composed of a flexible material, such as Starboard® polymer material or other plastic, which eliminates the need for slits.

Changes can be made in the above constructions without departing from the scope of the disclosure, it is intended that all matter contained in the above description or shown in the accompanying drawings shall be interpreted as illustrative and not in a limiting sense.

What is claimed is:

1. A carrier system for a vehicle, comprising:
at least three vacuum devices, each having a pad shaped and sized to removeably seat with a vehicle to form a vacuum cavity, a plunger attached to the pad and in fluid communication with the vacuum cavity, and an indicator associated with the vacuum device to indicate the level of vacuum pressure within the vacuum cavity;
a frame having inner and outer surfaces, the inner surface of the frame being removeably attached to each of said at least three vacuum devices; and,
one or more mounts attached to the outer surface of the frame, each mount being shaped and sized to mate and secure a recreational article; and each mount being removeably attached to the outer surface of the frame wherein the frame is divided into at least two portions, and the at least two portions are connected by one or more segments that define slits enhancing the flexibility of the frame.

2. A carrier system for a vehicle, comprising:
at least three vacuum devices, each having a pad shaped and sized to removeably seat with a vehicle to form a vacuum cavity, a plunger attached to the pad and in fluid communication with the vacuum cavity, and an indicator associated with the vacuum device to indicate the level of vacuum pressure within the vacuum cavity;
a frame having inner and outer surfaces, the inner surface of the frame being removeably attached to each of said at least three vacuum devices; and,
one or more mounts attached to the outer surface of the frame, each mount being shaped and sized to mate and secure a recreational article; and each mount being removeably attached to the outer surface of the frame wherein the frame is generally V-shaped and has at least two generally linear bars extending between at least three generally circular portions; the generally linear bars also define slits enhancing the flexibility of the frame; and wherein a vacuum device is attached to each of the at least three generally circular portions of the frame.

3. A carrier system for a vehicle, comprising:
at least three vacuum devices, each having a pad shaped and sized to removeably seat with a vehicle to form a vacuum cavity, a plunger attached to the pad and in fluid communication with the vacuum cavity, and an indicator associated with the vacuum device to indicate the level of vacuum pressure within the vacuum cavity;
a frame having inner and outer surfaces, the inner surface of the frame being removeably attached to each of said at least three vacuum devices; and,
one or more mounts attached to the outer surface of the frame, each mount being shaped and sized to mate and secure a recreational article; and each mount being removeably attached to the outer surface of the frame wherein the frame is generally V-shaped and has at least two generally linear bars extending between at least three generally rectangular portions; wherein a vacuum device is attached to each of the generally rectangular portions; and wherein a vacuum device is attached to the inner surface of the linear bars.

4. A carrier system for a vehicle, comprising:

at least three vacuum devices, each having a pad shaped and sized to removeably seat with a vehicle to form a vacuum cavity, a plunger attached to the pad and in fluid communication with the vacuum cavity, and an indicator associated with the vacuum device to indicate the level of vacuum pressure within the vacuum cavity;

a frame having inner and outer surfaces, the inner surface of the frame being removeably attached to each of said at least three vacuum devices; and, one or more mounts attached to the outer surface of the frame, each mount being shaped and sized to mate and secure a recreational article; and each mount being removeably attached to the outer surface of the frame wherein the frame comprises three generally rectangular portions arranged in a generally linear pattern; the rectangular portions are connected by segments that define slits to enhance flexibility allowing the frame to bend to accommodate curvature of the vehicle; a mount is attached to an outer surface of a center rectangular portion; and vacuum devices are attached to the inner surface of each rectangular portion.

5. A carrier system for a vehicle, comprising:

at least three vacuum devices, each having a pad shaped and sized to removeably seat with a vehicle to form a vacuum cavity, a plunger attached to the pad and in fluid communication with the vacuum cavity, and an indicator associated with the vacuum device to indicate the level of vacuum pressure within the vacuum cavity;

a frame having inner and outer surfaces, the inner surface of the frame being removeably attached to each of said at least three vacuum devices; and, one or more mounts attached to the outer surface of the frame, each mount being shaped and sized to mate and secure a recreational article; and each mount being removeably attached to the outer surface of the frame wherein the frame has a second linear bar extending generally downwardly at about a 170-190 degree angle to the first generally linear bar and terminating in a generally circular portion; wherein slits are defined at about equally spaced locations along the second linear bar.

6. A carrier system for a vehicle, comprising:

at least three vacuum devices, each having a pad shaped and sized to removeably seat with a vehicle to form a vacuum cavity, a plunger attached to the pad and in fluid communication with the vacuum cavity, and an indicator associated with the vacuum device to indicate the level of vacuum pressure within the vacuum cavity;

a frame having inner and outer surfaces, the inner surface of the frame being removeably attached to each of said at least three vacuum devices; and, one or more mounts attached to the outer surface of the frame, each mount being shaped and sized to mate and secure a recreational article; and each mount being removeably attached to the outer surface of the frame wherein the frame includes a generally triangular shaped portion with a rearwardly extending ladder shaped portion, the ladder shaped portion being angularly adjustable relative to the triangular shaped portion; wherein the ladder shaped portion has two side members connected by a plurality of crossbars; wherein said ladder shaped portion has cradle shaped members attached along a lower portion of each side member and each cradle shaped member defines a recess that is sized and shaped to receive a portion of a recreational article.

* * * * *